US009786282B2

(12) United States Patent
Bondarev et al.

(10) Patent No.: US 9,786,282 B2
(45) Date of Patent: Oct. 10, 2017

(54) MOBILE THOUGHT CATCHER SYSTEM

(71) Applicant: MYLE Electronics Corp., Calgary (CA)

(72) Inventors: Pavel Bondarev, Calgary (CA); Aleksandr Vetsak, Calgary (CA)

(73) Assignee: MYLE Electronics Corp., Calgary (CA)

( * ) Notice: Subject to any disclaimer, the term of this patent is extended or adjusted under 35 U.S.C. 154(b) by 0 days.

(21) Appl. No.: 14/921,647

(22) Filed: Oct. 23, 2015

(65) Prior Publication Data
US 2016/0118044 A1  Apr. 28, 2016

(30) Foreign Application Priority Data
Oct. 27, 2014  (CA) ...................................... 2869245

(51) Int. Cl.
| | |
|---|---|
| G10L 15/22 | (2006.01) |
| G10L 15/26 | (2006.01) |
| G06F 17/30 | (2006.01) |
| G10L 15/30 | (2013.01) |

(52) U.S. Cl.
CPC ........ G10L 15/26 (2013.01); G06F 17/30746 (2013.01); G06F 17/30778 (2013.01); *G10L 15/30* (2013.01)

(58) Field of Classification Search
CPC ..................................................... G10L 15/22
USPC ......................................................... 704/235
See application file for complete search history.

(56) References Cited

U.S. PATENT DOCUMENTS

| | | | |
|---|---|---|---|
| 9,275,642 B2 * | 3/2016 | Abdossalami | .......... G10L 15/26 |
| 2008/0059179 A1 | 3/2008 | Lagadec | |
| 2009/0070109 A1 | 3/2009 | Didcock et al. | |
| 2013/0297308 A1 | 11/2013 | Koo et al. | |
| 2014/0067362 A1 | 3/2014 | Hershenhorn | |

OTHER PUBLICATIONS

MYLE Electronics Corp., Indiegogo campaign description, "MYLE TAP: Wearable Thought Catcher", downloaded on Sep. 29, 2015.
Wikipedia, "Siri", downloaded on Sep. 29, 2015.
Office action mailed Mar. 8, 2016 by the Canadian Intellectual Property Office (CIPO) in Canadian counterpart patent application No. CA 2,869,245.
Office action mailed Sep. 19, 2016 by the Canadian Intellectual Property Office (CIPO) in Canadian counterpart patent pplication No. CA 2,869,245.

* cited by examiner

*Primary Examiner* — Susan McFadden
(74) *Attorney, Agent, or Firm* — ATMAC Patent Services Ltd.; Andrew T. MacMillan

(57) ABSTRACT

A voice capture device helps users capture and act upon fleeting thoughts. In response to user activation a processor stores an audio file corresponding to a finite amount of audio captured by a microphone of the voice capture device. The processor automatically transfers the audio file to one or more servers either directly via the Internet or via an intermediate device at a later time when such transfer is possible. The one or more servers automatically convert the audio file to a corresponding text record, automatically add the text record to a history of text records for the user, and send a copy of the history of text records for the user to a computing device associated with the user. The user can thereby utilize the computing device to review the history of text records and be reminded of actions that need to be taken.

20 Claims, 9 Drawing Sheets

(voice capture device)

Wearable voice capture device

MOBILE THOUGHT CATCHER SYSTEM

CROSS-REFERENCE TO RELATED APPLICATIONS

This application claims the benefit of priority of Canadian Patent Application No. 2,869,245 filed Oct. 27, 2014, which is incorporated herein by reference.

BACKGROUND OF THE INVENTION (1) Field of the Invention

The invention pertains generally to note-taking and note-management systems. More specifically, the invention relates to helping users capture and act upon fleeting thoughts by the use of a voice capture device.

(2) Description of the Related Art

A problem that many people have encountered in their daily lives is that, while engaged in an activity, an idea unrelated to that activity will suddenly occur. When this happens, a person essentially has two choices: temporarily stop what he/she is doing in order to make note of the idea, or continue with the activity without taking any note and instead rely on their memory.

For a typical busy person, trusting their memory without any written record of an idea equates to a high probability that the idea will be forgotten. Multiple independent ideas may arrive in rapid succession with each new arrival pushing out the previous. Over time many people find that the risk of forgetting these momentary thoughts is too great if notes are not immediately taken upon an idea's arrival. Most people care about efficiency and dislike the effort of trying to re-remember something they have forgotten. As impromptu ideas are often inspirational and/or have significant value, most people adopt some kind of a note-taking system in order to capture at least the best of these ideas before they are gone.

The problem of instant memorialization of thoughts is currently solved in a number of ways. The most common solution is low-tech and involves manually taking notes with a pen and paper. Hi-tech solutions include using smartphone voice recorder apps, typing quick notes into a text-based note-taking devices, and recording voice notes with portable voice recorders. More sophisticated smartphone applications such as Apple Inc.'s "Siri" application utilize voice recognition technology to allow users conversational interaction with many applications, including reminders, weather, stocks, messaging, email, calendar, contacts, notes, music, clocks, web browser, and maps.

However, all of these existing solutions are highly distracting and time consuming. For instance, taking a note with pen and paper requires the person to actually pick up the pen and paper to physically write the note, store the paper-based note in a safe place, and remember to check the paper to read and act upon the note at a later, more convenient time.

The various smartphone apps are likewise all highly distractive and time consuming. Cell phone apps take focus from the user by requiring the user to look at and operate the smartphone, which is illegal under distracted driving laws while operating a motor vehicle in many jurisdictions. Using a smartphone app requires reaching for a smartphone, holding it, unlocking or otherwise activating the touchscreen, launching a specific app, then locking or otherwise deactivating the touchscreen, and putting the phone back into its storage place.

Dedicated voice recording devices are somewhat less distracting at the time the note is taken because generally the user only has to pick up the device, press a button to start recording a voice note, press that same button to stop recording, and then put the device back into its storage place. However, in many jurisdictions the same laws that make it illegal to use smartphones while driving also outlaw holding in the user's hand any electronic device while operating a motor vehicle. Further, like all of the above solutions, dedicated voice recording devices are still time consuming for a person to use effectively because they require the user to set aside future time to review the voice recordings and act upon the various voice notes. If the user does not regularly review the recorded audio files then the voice recordings are of little value.

Thus, regardless of whether a person chooses to immediately record a sudden thought or to trust their memory, the end result is that the person is distracted from their other activities. The distraction is either physical in that the person must pick up, hold and utilize items such as pen, paper, smartphone, or other electronic devices with their hands, or mental in that the person must devote some percentage of their consciousness to remembering the idea and dealing with the stress of likely forgetting despite the mental effort.

BRIEF SUMMARY OF THE INVENTION

In an exemplary embodiment of the invention, a system assists users with instant memorization of fleeting thoughts by converting voice notes recorded by the user with a wearable voice capture device to text records stored in the cloud and/or the user's smartphone and reviewable by the user on any Internet-connect electronic device.

In an exemplary embodiment of the invention, a system assists users with instant memorization of fleeting thoughts by converting voice notes recorded by the user with a wearable voice capture device to text records that are automatically assigned to the user's respective associated smartphone and/or computer applications.

In an exemplary embodiment of the invention, users can instantly memorize/save their thoughts, ideas and insights by making voice recordings at any place and at any time via a dedicated hardware device that is small, light, and wearable by the user so that it is always on their person. This dedicated hardware device automatically synchronizes the saved audio with the user's smartphone and/or cloud account. The user's smartphone and/or cloud system then converts the audio into text records, analyzes each text record, sorts the text records and assigns each into one of a plurality of groups by context, and exchanges and synchronizes the text records with the users' own and 3rd party software applications.

In an exemplary embodiment of the invention, a system saves voice notes in both audio format and text formats and the user may choose to keep a record of either or both of these formats.

In an exemplary embodiment of the invention, a system saves GPS coordinates of where audio notes where taken along with time and date; when the user views the user's history of text records the user can also see the location and time where each note was taken.

In an exemplary embodiment of the invention, a system performs analytics regarding a user's saved thoughts/insights/ideas in order to automatically provide the user with reports based on the content therein and to automatically update the user's note-related smartphone and computer applications.

In an exemplary embodiment, a voice capture device helps users capture and act upon fleeting thoughts. In response to user activation a processor stores an audio file corresponding to a finite amount of audio captured by a microphone of the voice capture device. The processor automatically transfers the audio file to one or more servers either directly via a network such as the Internet or via an intermediate device at a later time when such transfer is possible. The one or more servers automatically convert the audio file to a corresponding text record, automatically add the text record to a history of text records for the user, and send a copy of the history of text records for the user to a computing device associated with the user. The user can thereby utilize the computing device to review the history of text records and be reminded of actions that need to be taken.

In an exemplary embodiment, the one or more cloud servers and/or the user's smartphone process the text records corresponding to the user's audio files and add the records to the appropriate groups such as to-do lists, to-buy lists, calendar, etc. according to keywords detected within the text records.

In an exemplary embodiment, the system performs note-categorization and provides a user-friendly software development toolkit (SDK) allowing users to access and create their own reports and functionality operating according to the user's text records.

An advantage of certain embodiments of the invention is that users are enabled to instantly and easily save their thoughts in a hands-free, non-distracting way.

An advantage of certain embodiments of the invention is that users enjoy time savings because the system automatically assists the user with recoverability of their saved notes, updates the user's daily routines and automates the assignment of notes to appropriate applications and groups without the user needing to continually review their previously recorded notes.

An advantage of certain embodiments of the invention is that the system assists users to efficiently utilize their voice notes rather than just assisting users to record notes.

These and other advantages and embodiments of the present invention will no doubt become apparent to those of ordinary skill in the art after reading the following detailed description of embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
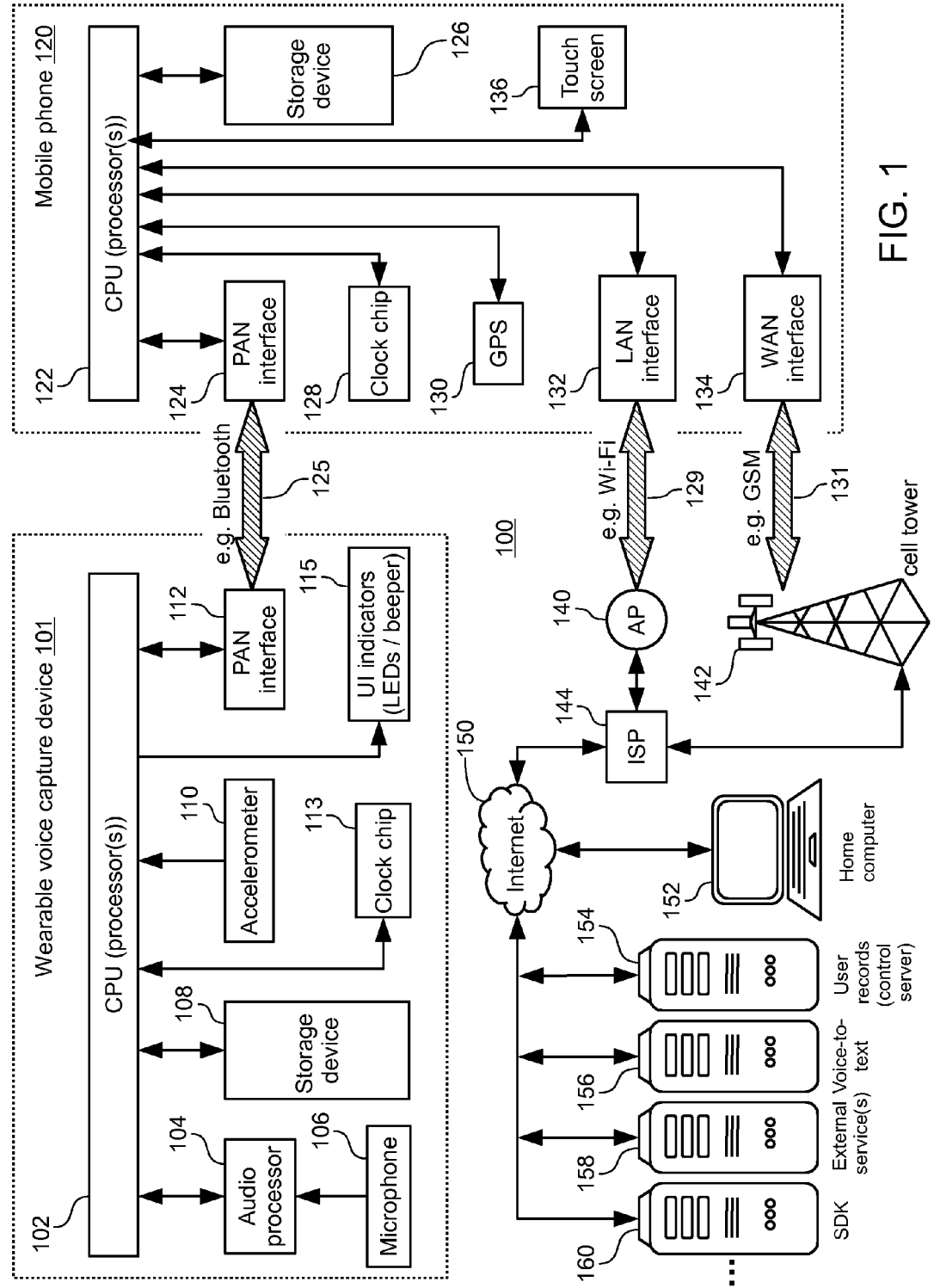
FIG. 1 shows a block diagram of a system for helping users capture and act upon fleeting thoughts according to an exemplary embodiment of the invention.

FIG. 1 shows a block diagram of a system for helping users capture and act upon fleeting thoughts according to an exemplary embodiment of the invention.

The system 100 includes a voice capture device 101. The voice capture device 101 in this embodiment is a small electronic device worn clipped to the user's collar or another piece of clothing. The voice capture device 101 includes a central processing unit (CPU) including one or more processors 102. In the following description the singular form of the word "processor" will be utilized as it is common for an embedded CPU of a portable computing device to have a single processor 102 (sometimes also referred to as a core); however, it is to be understood that multiple processors 102 may also be configured to perform the described functionality of the voice capture device 101 in other implementations. For example, the CPU of the voice capture device 101 may be implemented with a multi-core architecture.

Coupled to the processor 102 within the voice capture device 101 are: an audio processor 104, an integrated microphone 106, a storage device 108, an accelerometer 110, a personal area network (PAN) interface 112, a clock chip 113, and one or more user interface (UI) indicators 115 such as light emitting diodes (LEDs), beeper, speaker, vibration motor, etc.

The audio processor 104 receives an audio signal from the microphone 106. The audio processor 104 includes an analog to digital converter (ADC) to convert the audio signal from the microphone 106 into digital signals for processing by the processor 102. The audio processor 104 also includes filter circuitry that removes audio frequencies not required for human speech from the audio signal before passing the processed audio signal to the processor 102.

The storage device 108 stores both recorded audio files representing the sounds obtained from the microphone along with software instructions executed by the processor 102 in order to cause processor 102 to perform the various functions described herein. In this embodiment, the storage device 108 has a storage capacity of 128 MB and is implemented by a flash memory; however, other storage capacities and types of storage device may be utilized according to application specific requirements.

The accelerometer 110 detects movement of the wearable voice capture device 101. In this embodiment, the voice capture device 101 is activated by the user physically tapping a finger onto the external surface of the voice capture device 101 in order to cause the accelerometer 110 to detect a sudden movement greater than a certain threshold. The accelerometer 110 detects this tapping and sends an activation signal to the processor 102. As described below, multiple taps by the user can also be utilized to configure certain settings of the voice capture device 101 such as to enter a Bluetooth pairing mode in order to pair the voice capture device 101 with other of the user's electronic devices such as smartphone 120.

The PAN interface 112 in this embodiment is a Bluetooth communications chip providing the processor 102 with the ability to communicate wirelessly with other Bluetooth compatible devices such as the user's smartphone 120.

The clock chip 113 is a real-time clock chip utilized to track time and date. The clock chip 113 is automatically kept synchronized with the rest of the world by the processor 102 obtaining time updates via the PAN interface 112.

One or more UI indicator(s) 115 provide feedback to the user such as indicating when audio from the microphone 106 is being recorded by the processor 102 and saved in an audio file to storage device 108. In one configuration, the UI indicators 115 include one or more light emitting diode(s) (LEDs) that display different colors or flashing sequences in order to indicate different information to the user. In another configuration, the UI indicators 115 include a beeper or speaker to produce audible feedback to the user or a vibration motor to provide vibration feedback to the user for the same purpose. Different types of UI indicators 115 may be included together on a single voice capture device 101 to provide UI output and feedback to the user employing different senses such as visual (e.g., LEDs), audible (e.g., beeper/speaker), touch (e.g., a vibration device), etc.

Also included within the voice capture device 101 are a rechargeable battery and charging circuitry. The battery provides power to the above mentioned components and the charging circuitry charges the battery when coupled to an external power source such as household power. As these components are well-known in the art and are utilized in the known manner they are not illustrated in FIG. 1 and further description is omitted herein for brevity.

All (or some) of the components of the voice capture device 101 could be implemented in one microchip.

The system 100 of FIG. 1 further includes a smartphone 120, which is intermittently coupled to the voice capture device 101 via a Bluetooth connection 125 in this example. Other types of connections 125 other than Bluetooth may be used as well.

The smartphone 120 includes various components including a PAN interface 124 being a Bluetooth communications chip in this embodiment, a clock chip 128 for tracking time and date, a global positioning system (GPS) chip 130 utilized to determine the physical location of the smartphone 120 according to signals received from a plurality of satellites orbiting the earth, a local area network (LAN) interface 132 being a Wi-Fi® compatible communication chip based on the Institute of Electrical and Electronics Engineers (IEEE) 802.11 standards, a wide area network (WAN) interface 134 being a global system for mobile communications (GSM) compatible communication chip for transferring data and audio over a cellular network, and a user interface (UI) being implemented as a touchscreen 136. Other communication interfaces may also be included in other configurations such as a code division multiple access (CDMA) interface, near field communication (NFC) interface, etc.

As with the voice capture device 101, the smartphone 120 also includes a rechargeable battery and charging circuitry. The battery provides power to the above mentioned components and the charging circuitry charges the battery when coupled to an external power source such as household power. Again, as these components are well-known in the art and are utilized in the known manner they are not illustrated in FIG. 1 and further description is omitted herein for brevity.

In the following description the plural form of the word "processors" will be utilized for the one or more processors 122 of the smartphone as it is common for the CPU of modern smartphone to have multiple processors 102 (sometimes also referred to as cores); however, it is to be understood that a single processor 102 may also be configured to perform the described functionality of the smartphone 120 in other implementations.

The inventors anticipate the smartphone 120 in many implementations of system 100 will consist of the user's personal mobile phone already owned by the user before beginning to utilize system 100. However, of course the smartphone 120 may also be newly obtained by the user specifically for the purpose of forming system 100. Tablet computers or other computing devices may also be employed to serve the purpose of the device labelled 'smartphone' 120. In either case, the smartphone 120 (or other similar device) runs a predetermined application referred to herein as a voice-note application, which may be download from an application store on the Internet 150, for example hosted on the user records server 154 shown in FIG. 1.

The smartphone 120 is coupled to the Internet 150 via either (or both) of a Wi-Fi connection 129 and/or GSM connection 131 in this example. The Wi-Fi connection 129 is to an access point 140 provided by an Internet service provider (ISP) 144. The GSM connection 131 is via a cell tower 142 which is coupled to the ISP 144.

Other Internet-connected electronic devices with a PAN interface compatible with that of the voice capture device 101 may also be used in place of the smartphone 120. For example, rather than smartphone 120, the user's home computer 152 having a compatible PAN interface (e.g., Bluetooth) may be utilized to run the voice-note application. There may be different voice-note applications made available by the user records server 154 supporting different device types and operating systems.

As illustrated in FIG. 1, also coupled to the Internet are one or more computer servers including a user records server 154, a voice-to-text server 156, any number of external service servers 158, and a software development kit (SDK) server 160 providing an application programming interface (API) for users and developers.

Figure 2:
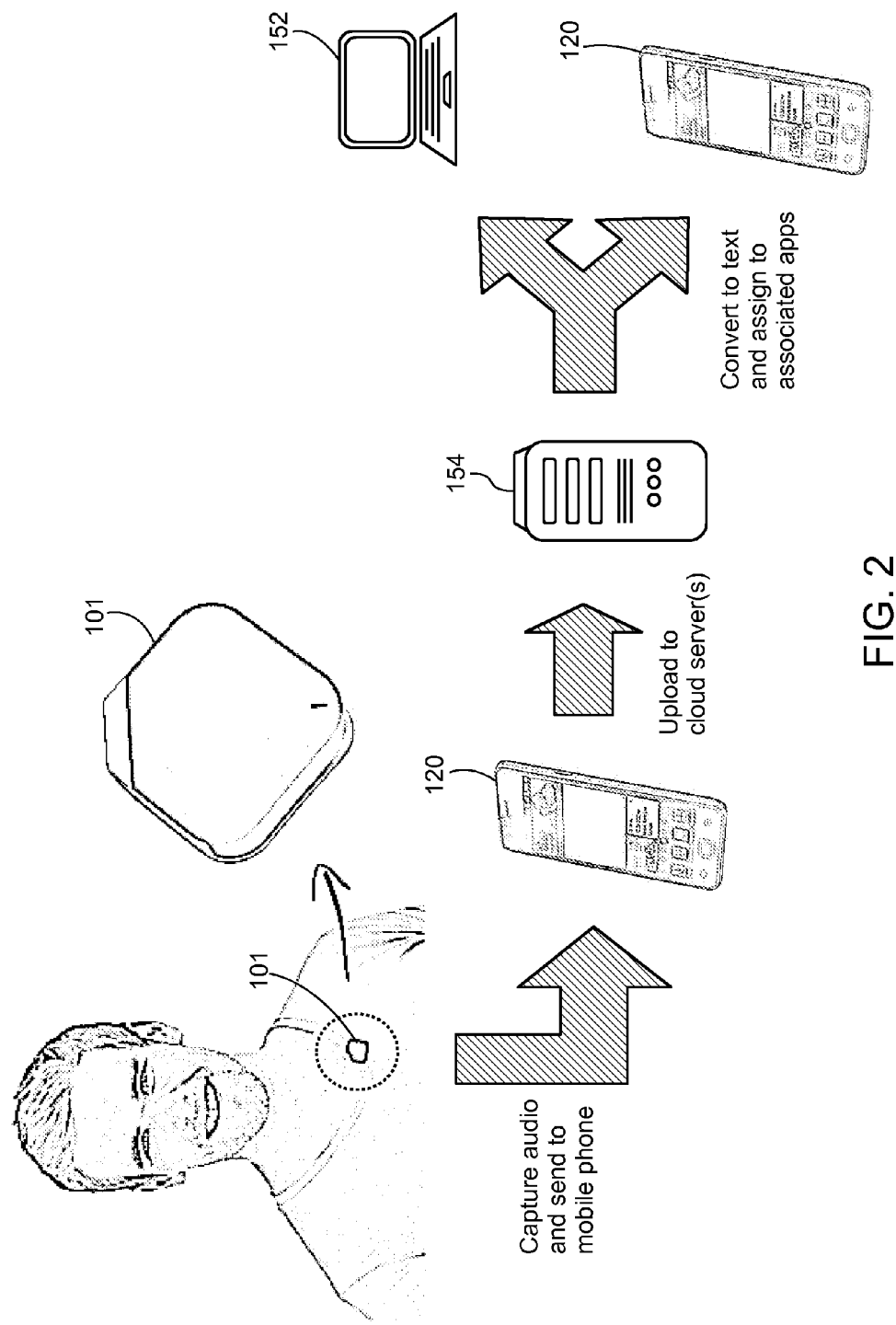
FIG. 2 shows a flowchart illustrating a use case scenario of system of FIG. 1 according to an exemplary embodiment of the invention.

FIG. 2 shows a flowchart illustrating a use case scenario of system 100 according to an exemplary embodiment of the invention. The flowchart in FIG. 2 is described with reference to the various components shown in the block diagram of FIG. 1.

A user wears the voice capture device 101 pinned or clipped to the collar of the user's shirt. As the user is going about their regular activities, the user may have an idea that he/she wishes to remember and act upon at a later, more convenient time. An example of a simple idea that may occur to the user at a random time during the day is to "buy milk." Upon thinking of this, the user physically taps the voice capture device 101 and the accelerometer 110 within detects the tap and causes the voice capture device 101 to enter voice recording mode. The user then says, "buy milk" and the user's voice is captured by mic 106 and a corresponding voice audio file is stored in the storage device 108 by the processor 102.

The processor 102 of the voice capture device 101 thereafter establishes a Bluetooth 125 connection with the user's smartphone 120. This connection may be established immediately after the audio file is recorded such as when the user's smartphone 120 is currently located within range of the voice capture device 101 (e.g., phone 120 is located in the user's trouser pocket). Alternatively, the Bluetooth connection 125 may be automatically established at any later time such as when the voice capture device 101 comes within Bluetooth range of the smartphone 120. For instance, this may occur when the user returns to their desk where the phone 120 is located in a desk drawer. Of course, Bluetooth is not a requirement and other types of connection 125 may be employed such as near field communication (NFC), Wi-Fi, or other wired or wireless protocols.

The smartphone 120 is running a special app, referred to herein as a voice-note app, that is operable to receive the audio file from the voice capture device 101 and to then automatically send the audio file to the voice-to-text server 154 on the Internet 150 via an available GSM or Wi-Fi connection 131, 129. Other types of cellular technology or wireless or wired protocols may be utilized to establish connections 131, 129 is other embodiments.

Continuing the above example where the user recorded audio of "buy milk", the voice-to-text server 154 converts the audio file to a text record including the text "buy milk" and sends this text record back to the special voice-note app running on the smartphone 120. The voice-note app then sends the text record "buy milk" to the user records server 154 where the text record is both saved with a history of the user's previous text records and automatically parsed in order to determine whether the text record pertains to a specific one or more of the user's application(s) or note lists/groups. For example, some text records may pertain to different topics or activities and the user records server 154 automatically sends each text record to the appropriate destination (e.g., to the appropriate external application or list type).

In this example, the word "buy" constitutes a keyword that indicates that the text record should be placed on the user's shopping list. Thus the user records server 154 adds the text record "buy milk" to the user's shopping list stored in the cloud (i.e., within the user records server 154 or on another external server 158) and/or to any other applications. In a preferred embodiment, the user's shopping list is synchronized with the shopping list locally stored on the user's smartphone 120. In this way, when the user later utilizes either their home computer 152 to view the cloud version of their shopping list or utilizes their smartphone 120 to view the synchronized copy of their shopping list stored on the smartphone 120, they will see the newly added note to "buy milk". This is particularly useful when the user later finds themselves at or near the grocery store and decides to check their shopping list. As a result of the above-described process, the user was beneficially not required to manually review their recorded notes or manually add the item "buy milk" to their shopping list. The entire process after the user realizes that they need to "buy milk" and records this thought with the voice capture device 101 was automatically performed by system 100.

Figure 3:
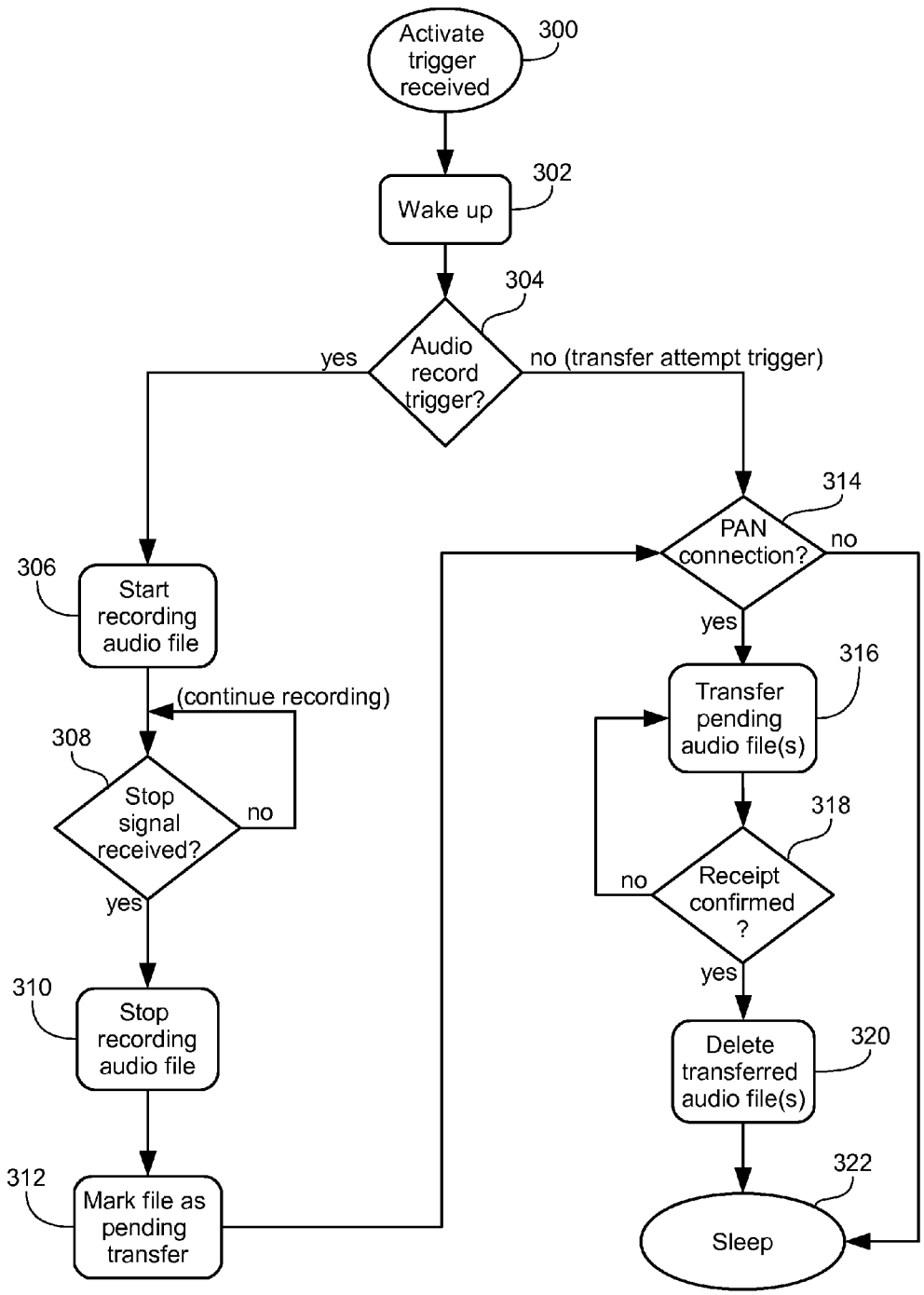
FIG. 3 shows a flowchart of operations performed by the wearable voice capture device of FIG. 1 according to an exemplary embodiment of the invention.

FIG. 3 shows a flowchart of operations performed by the wearable voice capture device of FIG. 1 according to an exemplary embodiment of the invention. The steps of FIG. 3 are not restricted to the exact order shown, and, in other embodiments, shown steps may be omitted or other intermediate steps added. In this embodiment, the processor 102 executes software instructions loaded from the storage device 108 in order to cause the voice capture device 101 to perform the illustrated steps.

The process of FIG. 3 begins at step 300 upon the occurrence of an activation trigger. There are two types of activation triggers in this embodiment: an audio record trigger and a PAN connection trigger. The difference between these two types of activation triggers is explained below with respect to step 304.

At step 302, because an activation signal has been received, required components of voice capture device 101 are powered up. To save battery power in this embodiment the voice capture device 101 generally operates in a low power mode where most components are in a sleep mode and thereby consume very little power. Step 302 represents the voice capture device 101 coming back to life after receiving an activation trigger signal while in the sleep mode.

At step 304, the processor 102 determines which kind of activation trigger has been received. As previously mentioned, in this embodiment there are two different triggers that may wake up the voice capture device 101: an audio record trigger and a PAN connection trigger.

The first type of activate trigger is an audio record trigger. The audio record trigger in this embodiment is a signal from the accelerometer 110 indicating that the user has tapped the side of the wearable voice capture device 101. In this embodiment, the voice capture device 101 is activated upon the accelerometer 110 detecting a motion by the user exceeding a threshold magnitude.

Other types of audio record activation triggers may also be utilized including the user pressing a button (not shown) on the voice capture device 101 or speaking a certain command or making a certain noise that is received by the microphone 106 and detected by the processor 102 as an audio record trigger signal. For example, the voice capture device 101 may include a small button located on the front side (see FIG. 5), and the activation trigger corresponds to the button being pressed by the user. Alternatively, the voice recorder may include a software module stored in the storage device 108. The software module is continuously executed by the processor 102 and causes the one or more processors to monitor ambient audio detected by the microphone 106 exceeding a threshold magnitude in order to detect when a user speaks a particular activation code. Upon detecting the particular activation code, the software module automatically activates the activation trigger so that the processor 102 begin recording the audio file. In yet another example, the processor 102 remains in the sleep mode but the audio processor continually monitors the ambient audio detected by the microphone 106 to detect when a certain noise (e.g., above a threshold amplitude, at a certain frequency, etc.) is detected.

The second type of activate trigger in this embodiment is a PAN connection trigger. The PAN connection trigger is a periodic signal that is generated by the clock chip 113 as long as there is at least one audio file in the storage device 108 waiting to be sent via PAN interface 112 to the user's smartphone 120. When there are no audio files pending transfer, there will be no PAN connection triggers (or PAN connection triggers will be ignored or otherwise blocked); however, once an audio file is recorded and stored in storage module 108, there will be a periodic PAN connection trigger generated by the clock chip 113 to wake up the device 101. For instance, a PAN connection trigger may occur every twenty minutes until the pending audio file is successfully transferred to the user's smartphone 120. The exact time duration between each periodic PAN connection trigger may be a user configurable setting in some embodiments.

The processor 102 at step 304 examines the activate trigger received at step 300 and branches to either step 306 when the trigger was an audio record trigger or branches to step 314 when the trigger was a PAN connection trigger.

At step 306, because the activate trigger received at step 300 was an indication that the user wishes to record audio (i.e., an audio record trigger), the processor 102 starts recording the audio picked up by the microphone 106 and stores a digital representation as a corresponding audio file in storage device 108. The format of the audio file saved by the processor 102 in this embodiment includes WAV, SPEEX, OPUS and the audio file is optimized for speech-to-text conversion. All frequencies unused in normal voice are filtered out. By formatting the audio file in this manner with a SPEEX or OPUS format, a thirty-second clip of audio from the user will typically require about 50 KB of storage in the storage device 108.

In addition to LED and vibration alerts, the beeper/speaker of the UI indicators 115 is utilized to produce a short audible tone upon user activation of the voice capture device 101 at step 306 when the audio file is starting to be recorded. The audible tone is useful to provide feedback to the user that the audio activation trigger (e.g., the user tapping the side of the voice capture device 101) was successful without requiring the user to visually look at the LEDs or hold the device 101. The beeper/speaker may also be utilized in conjunction with the LEDs to provide feedback to the user for any other functions desired, for example to indicate Bluetooth pairing etc.

At step 308, the processor 102 continues recording the voice sounds picked up by the microphone 106 into the audio file until a stop signal is received. The stop signal in this embodiment is one of another signal from the accelerometer 110 indicating that the user has again tapped the side of the voice capture device 101 or a thirty second timer alert received from the clock chip 113 indicating that the audio recording has already captured thirty seconds of audio. In another embodiment, the stop signal is automatically generated by the processor 102 upon detecting a predetermined duration of silence such as a pause in the speech by the user. For instance, if no sounds exceeding a predetermined threshold magnitude are picked up by the microphone 106 for three seconds, the processors 102 may automatically generate the stop signal to stop recording to the audio file. The length of the pause required to end the recording is a user-configurable setting.

Although each audio file is capped at predetermined maximum time duration of thirty seconds in this embodiment, other time limits may be utilized in other embodiments. The maximum duration of each audio file may also be a user configurable setting with a range from 1 second to unlimited (e.g., audio files may grow to use all available storage space in the storage device 108 or a remote storage device). If no stop signal is received, the processor 102 continues recording the audio from the mic 106 into the audio file, which slowly grows in size accordingly. When a stop signal is received, control proceeds to step 310.

At step 310, because a stop signal has been received, the processor 102 stops recording the sounds received from the mic 106 into to the audio file. The audio file is finished being saved at this point. The audio file may have a filename that includes a sequence number and the processors may increment the sequence number with each successive audio file recorded. The processor 102 may also include with the audio file the time and date that the audio file was recorded as tracked by the clock chip 113. This may be done, for example, either appended to the filename, embedded within the audio file, or as a separate file that is transferred along with the audio file. Likewise, in some embodiments the voice capture device 101 also includes a GPS chip (not shown) and the position of the voice capture device 101 at the time the audio file was created is also included by the processor 102 with the audio file.

At step 312, the processor 102 marks the newly recorded audio file as pending transfer. In this embodiment, each audio file recorded by the voice capture device is marked as pending transfer until it is successfully transferred to the user's smartphone 120 for processing.

At step 314, the processor controls the personal area network (PAN) interface 112 to try and connect with the user's smartphone 120 and checks the PAN interface 112 to determine whether a PAN connection 125 (e.g., Bluetooth connection) with the user's smartphone 120 has been established. When yes, control proceeds to step 316 to transfer the pending audio file(s) via the PAN connection 125 to the smartphone 122.

When there is no current PAN connection 125 to the smartphone 120 and none is possible (e.g., because the smartphone 120 is not within range of the PAN interface 112 or the user's smartphone 120 is shut off), control proceeds to step 322 to put the voice capture device 101 back into sleep mode to conserve batter power. As previously mentioned, because there is now at least one audio file pending transfer, the PAN connection trigger from the clock chip 113 will wake up the voice capture device 101 again after a predetermined time duration to again attempt to establish a PAN connection at step 314. In some embodiments, when a new audio recording is created, the processor 102 sets an associated property tag of the wireless communication interface supported by the smartphone 120 (e.g., a property tag of PAN interface 112) indicating that an audio file is pending transfer. Based on changes of this property tag, the transfer procedure is initiated. The PAN interface 112 may also provide an interrupt to the processor 102 when a connection 125 is available.

At step 316, the processor 102 uploads the audio file(s) pending transfer in the storage device 108 to the smartphone 120 via the PAN connection 125.

At step 318, the processor 102 confirms that each of the uploaded files has been correctly received by the smartphone 120. This may be done by the processor 102 comparing a file checksum received from the smartphone 120 for each uploaded audio file with a corresponding file checksum computed for each audio file by processor 102. When proper receipt is confirmed, control proceeds to step 320; otherwise, when a particular audio file is found to have not been uploaded to the smartphone 120 correctly, control returns to step 316 to try to upload that particular audio file again. It should also be noted that in other embodiments an audio file may also be recorded as a live stream and transferred in parallel with the ongoing recording process. Each piece of the audio file is checked for proper transfer.

At step 320, the processor 102 optionally deletes each of the successfully transferred audio file(s) from the storage device 108. When an audio file is deleted, space is freed up in the storage device 108 to store future audio files as required. Whether or not to delete a successfully transferred audio file(s) at this step is a user configurable option.

At step 322, the processor 102 enters sleep mode. In sleep mode power is cut to one or more components of the voice capture device 101 in order to reduce battery drain. Well known sleep modes and power management techniques may be utilized at this step to reduce the standby power requirements of the voice capture device 101 while it is waiting for the next activation trigger (either for the user to record another audio file or for the PAN interface 112 to be polled to check for a possible connection 125 with the user's smartphone 120). To further increase battery duration the battery may also be charged via any technique including by the motion of the users body during regular activities.

Figure 4:
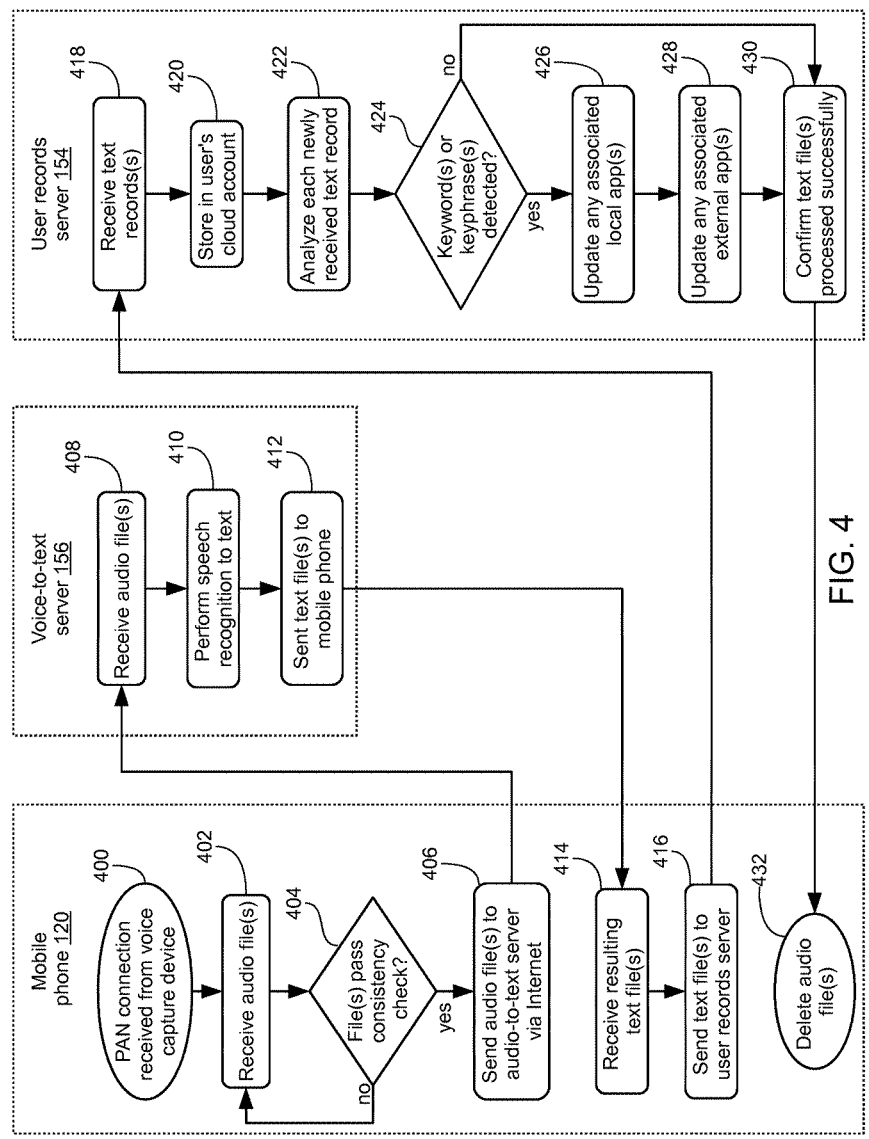
FIG. 4 shows a flowchart of operations performed by the smartphone, voice-to-text server, and user records server of FIG. 1 according to an exemplary embodiment of the invention.

FIG. 4 shows a flowchart of operations performed by the smartphone 120, voice-to-text server 156, and user records server 154 of FIG. 1 according to an exemplary embodiment of the invention. The steps of FIG. 4 are not restricted to the exact order shown, and, in other embodiments, shown steps may be omitted or other intermediate steps added. In this embodiment, processors 122 in the smartphone execute software instructions loaded from the storage device 126 in order to cause the smartphone 120 to perform the illustrated steps. Likewise, processors (not shown) in each of the voice-to-text server 156 and user records server 154 execute software instructions loaded from storage devices therein in order to cause these servers 156, 154 to perform the illustrated steps.

The process of FIG. 4 begins at step 400 when the smartphone 120 and voice capture device 101 establish a PAN connection 125. As mentioned earlier, in this embodiment the processor 102 of the voice capture device 101 automatically controls the PAN interface 112 to periodically attempt to establish a Bluetooth connection 125 with the smartphone 120 whenever there is at least one audio file stored in the voice capture device's 101 storage device 108 pending transfer. In some embodiments, when the associated property tag of the PAN interface 112 is asserted this indicates that at least one audio file is pending transfer and the change in the state of this tag can be detected in order to initiate the transfer procedure.

At step 402, the processors 122 of the smartphone 120 receive via the PAN interface 124 the transferred audio file(s) from the voice capture device 101.

At step 404, the processors 122 of the smartphone 120 confirm the proper transfer of the audio file(s) received from the voice capture device 101 by calculating the file checksum(s) and comparing with the file checksum(s) calculated by the voice capture device 101. When accuracy of the received audio file(s) is confirmed, the control proceeds to step 406; otherwise, control returns to step 402 to try and receive the corrupted file(s) again.

At step 406, the processors 122 of the smartphone 120 upload to the voice-to-text server 156 via the Internet 150 the audio file(s) received from the voice capture device 101 that have not already been converted to text records. This step is performed by the processors 122 controlling either the LAN interface 132 and/or WAN interface 134 within the smartphone 120 in order to connect to the Internet 150.

As some users may need to pay their cell phone provider a premium for data bandwidth utilized via the WAN interface 134 (GSM connection 131), the LAN interface 132 is utilized whenever possible. Whether the processors 122 will also utilize the WAN interface 134 as a fallback to transfer the audio file(s) is a user configurable setting in this embodiment. When first installing and running the voice-note app on the smartphone 120, the app displays a setup screen to the user via touchscreen 136 allowing the user to enable or disable transferring of audio files via WAN interface 134 along with all other user configurable settings.

The connection to the Internet 150 at step 406 may be established by the smartphone 120 immediately after the audio file(s) are received from the voice capture device 101 such as when the user's smartphone 120 is currently located within range of either or both of AP 140 and/or cell tower 142. Alternatively, the connection 129, 131 to the Internet 150 may be automatically established by the processors 122 at any later time such as when the smartphone 120 comes within range of either an AP 140 and/or cell tower 142. For instance, this may occur when the user carrying the smartphone 120 returns from a nature preserve lacking Internet service to an urban area that has cell towers 142 and/or APs 140 positioned every few city blocks.

At step 408, the voice-to-text server 156 receives the audio file(s) from the smartphone 120 via the Internet 150. Although not shown in FIG. 4, this transfer of files may also involve a file integrity check employing checksums to ensure that the audio file(s) are correctly transferred.

At step 410, the voice-to-text server 156 performs speech recognition on the received audio file(s) and generates a corresponding text record for each audio file. Any suitable voice-to-text algorithm may be employed by the voice-to-text server 156 at this step. Different algorithms may be utilized for different languages (e.g., English, Chinese, French, etc.). The particular language of the speech in a particular audio file may be automatically detected by the voice-to-text server 156 or may indicated by the smartphone 120 when transferring the audio file to the voice-to-text server 156 at step 408. For instance, the user's preferred language may be a user configurable setting in the voice-note application running on the smartphone 120, which is passed along with the audio file(s) to the voice-to-text server 156 at step 406.

In this embodiment, the voice-to-text server 156 is separate from the user records server 154 and may be run by a different vendor. As such, the embodiment shown in FIG. 1 supports utilizing any external voice-to-text service available on the Internet 150. In an alternate embodiment, the voice-to-text functionality may be built in to the user records server 154 (or built in to the voice capture device 101 or provided by the user's smartphone 120) so that an external voice recognition service is not required.

At step 412, the voice-to-text server 156 sends the text record(s) generated at step 410 to the smartphone 120 via the Internet 150. Although not shown in FIG. 4, the transfer of these text record files may also involve a file integrity check employing checksums to ensure that they are correctly transferred.

At step 414, the smartphone 120 receives the text record(s) from the voice-to-text server 156 via the Internet 150. The voice-note application running on the smartphone 120 updates the local copy of the text records in storage device 126.

At step 416, the smartphone 120 sends the text record(s) received from the voice-to-text server 156 to the user records server 154 via the Internet 150. Again, although not shown in FIG. 4, the transfer of text record files at this step may also involve a file integrity check employing checksums to ensure that they are correctly transferred.

At step 418, the user records server 154 receives the text record(s) from the smartphone 120 via the Internet 150.

At step 420, the user records server 154 stores each of the received text records into a central database storing the user's history of text records. One or more relational database(s) is/are utilized to store the user's history of text records in this embodiment; however, the term 'database' as utilized in this description is meant to refer to any stored collection of organized data. For instance, NoSQL (Not Only SQL) database may be employed for storage and retrieval of data instead of or in addition to one or more a structured query language (SQL) database(s).

In this embodiment, the user records server 154 serves a plurality of different users and each user has a unique user identifier. When storing the text records received from the smartphone 120 associated with a first user, the user records server 154 adds these text records to the database using the specific user identifier of the first user. The specific user identifier may be passed to the user records server 154 from the smartphone 120 when transferring the text file(s) at step 416 or may be stored at the user records server 154 and determined according to the unique device identifier of the smartphone 120 received at step 418. Any other suitable method of uniquely identifying the text records for each user may be employed such as keeping each user's account separate by authenticating a username/password combination or other keys.

At step 422, the user records server 154 analyzes each newly received text record in order to find certain predetermined keywords. For example, at this step the user records server 154 may parse each text record into separate words and then match each individual word and/or sequences of multiple words with predetermined keywords and keyphrases. Further description of an example embodiment of how the user records server 154 analysis the received text records is provided below with respect to Table 1 showing sample keywords and keyphrases.

At step 424, when none of the newly received text records for the user contains any predetermined keyword or keyphrases, control proceeds to step 430. Otherwise, for each text record that does contain at least one predetermined keyword or keyphrase, control proceeds to step 426. Table 1 described in further detail below shows an example of predetermined keywords and keyphrases that may be detected at this step for a user whose text records are in the English language. Different tables of keywords and keyphrases may be employed for each user and users are able to customize their specific keyword/phrase table in this embodiment via either the voice-note application and/or by accessing their cloud account at user records server 156 over the Internet 150. Further, in some embodiments the user can also associate the saved text with any application through tapping an app icon next to the text record while reviewing the user's history of text records.

At steps 426 and 428, the user records server 154 updates any associated applications with the text records according to the matched keywords and keyphrases. At step 426, 'local' application(s) are updated and at step 428 'external' applications are updated.

The local applications in this embodiment include the voice-note application running on the smartphone 120 along with any corresponding cloud applications running on the user records server 154 (which may be synchronized with the user's phone 120). Examples include a water drinking goal monitoring application, a to-do list, a shopping list, and any other user tools and applications that are provided by the vendor administrating the user records server 154.

The external applications in this embodiment include external vender applications and services that are not controlled by the vendor administrating the user records server 154. This includes external vendor services running on external servers 158 that are accessible by an application programming interface (API) via the Internet 150. Examples include Google® calendar, or a user corporate email tool such as Outlook® by Microsoft Inc.

As a single text record may include multiple keywords, the user records server may in fact update one or more local and external application(s) with a single text record. For example, a text record may be "buy milk and remind me to do this on Friday afternoon". As the keyword "buy" is present in this text record, at least the object of "milk" is added to the user's shopping list stored on the user records server 154 and synchronized with the user's smartphone 120. Additionally, because the keyphrase "remind me" is also present in this text record, a reminder to "buy milk" is added to the user's external calendar (e.g., Google calendar) with a reminder to be sent on Friday afternoon.

At step 430, the user records server 154 sends a message back to the smartphone 120 that each of the text record(s) received at step 418 have been successfully processed.

At step 432, the processors 122 of the smartphone 120 optionally delete the audio file(s) corresponding to the text record(s) that have now been successfully processed by the user records server 154. The purpose of the smartphone 120 deleting the audio files is to free up storage capacity in the storage device 126. Whether the original audio files are automatically deleted on the smartphone 120 and/or the user records server 154 (see below embodiment) is a user configurable setting.

In some embodiments, the saved audio files are continually stored until they pass a threshold number of days, which may be a user configurable setting. For example, audio files are stored until ninety days old and then are automatically deleted by the processors 122.

One benefit of saving the audio files on the smartphone 120 (and/or the user records server 154) is to allow the user to listen to these audio files at a later time. This may be useful if a particular text record is garbled as a result of an improper voice-to-text conversion. The user may not be able to understand the text record but upon listing to the corresponding audio file will be able to understand and remember the idea the user was trying to capture at that point in time.

Table 1 shows a data structure and rules stored in the storage device of the user records server 154 of FIG. 1 for a particular user. The user records server 154 performs the analytical algorithm of step 422 to determine whether any of the keywords and keyphrases of Table 1 match the words and phrases that are included in each newly received text record. When yes, the user records server 154 will send at least a portion of the text record to the either the local app or remote app as specific in Table 1.

TABLE 1

Keywords and phrases for analyzing text records

| Rule # | Keyword(s) and keyphrase(s) | Negative keyword(s) and keyphrase(s) | Local App | Remote App |
| --- | --- | --- | --- | --- |
| 1 | "to do" | | "ToDoListerApp" | |
| 2 | "water" | "shopping list", "buy", "purchase" | "WaterTrackerApp" | |
| 3 | "shopping list", "buy", "purchase" | | "ShoppingListApp" | |

TABLE 1-continued

Keywords and phrases for analyzing text records

| Rule # | Keyword(s) and keyphrase(s) | Negative keyword(s) and keyphrase(s) | Local App | Remote App |
|---|---|---|---|---|
| 4 | "remind me", "meeting", "appointment" | | | http://external.calendar.com |
| 5 | "post location" | | | https://onlinepositiontrackingsite.org |
| 6 | "calories", "just ate", "ate" | | "CalorieCounterApp" | |
| ... | ... | ... | ... | ... |
| N | * | | "NotesApp" | |

Table 1 also includes negative keywords and keyphrases. These are words that if also included in a particular text record will cancel the match even if one of the keywords/keyphrases are found in the text record. For example, in the above example for rule #2, the word "water" is a keyword that will cause at least the object of the text record to be sent to the "WaterTrackerApp" unless the words "shopping list", "buy" or "purchase" are also included in the text record. If the text record includes one of these negative keywords then the user records server 154 will not deem the text record to match rule #2 in Table 1. (i.e., in the example "buy water", the user records server 154 will not match rule #2 but will deem the text record to match rule #3 in Table 1 since a keyword "buy" is present and there are no specified negative keywords/phrases for the #3 rule.)

As to the portion of the text record that is passed to the associated local or external apps at steps 426, 428, the user records server 154 may pass the full text record without any modification. For example, when adding the text record "buy milk" to the shopping list, the user records server 154 may add the text "buy milk" verbatim without deleting the word "buy".

Alternatively, the user records servers 154 may add only the object portion of the text record to the shopping text by removing the keyword/keyphrase. For example, just the object "milk" would be added to the user's shopping list in this example. To allow the user records server 156 to determine the object portion of the text record, another column in Table 1 (or another table) shows how the text record should be parsed in order to determine the object. For instance, the parsing column for rule #2 may be: "($keyword) ($object)=>($object)" to indicate that the text record should be broken into two portions: a first portion with the matching keyword and a second portion with the object. The => notation in this example indicates that it is only the object that is to be added to the shopping list without adding the matching keyword.

Other more complex grammar rules may be programmed in Table 1 (or another Table 1) in order to match keywords and determine which portions of the text record should be added or otherwise sent to the associated application(s). For example, regular expressions may be utilized. Since regular expressions are well-known and understood in the art further description is omitted herein for brevity.

As shown in Table 1, an Nth rule at the end of the table has a wildcard as the keyword. This Nth rule is considered the default rule that will apply only if none of the above rules matches any keywords/phrases in a particular text record. In this example, the default Nth rule for this user is to simply add the text record to the user's general notes application. It should also be noted that wildcards may be utilized in any of the other rules for keywords or keyphrases or parts thereof as desired.

In this description the term 'keyword' is generally utilized when a single word is matched and the term 'keyphrase' is generally utilized when multiple words are matched; however, both keyword and keyphrase may be interchanged. In fact, any sequence of characters (including letters, spaces, punctuation, and/or other symbols) may be matched with corresponding characters in the text record.

Although the above example has focused on the voice capture device 101 transferring the pending audio files to a single smartphone 120, the voice capture device 101 may be paired to multiple of the user's electronic devices such as smartphone 120 and the user's home computer 152 or another computing device (not shown) such as the user's portable laptop or netbook computer(s). The voice capture device 101 may remember a plurality of paired devices 120, 152 and automatically detect whether any of these devices are connected to PAN interface 112 at step 314 of FIG. 3. The voice-note application and/or cloud account for the user may allow the user to manage the paired devices such as to add or remove paired devices.

The one or more UI indicators 115 and accelerometer 110 of the voice capture device may also act as a rudimentary user interface allowing the user to manually pair and unpair Bluetooth devices with the voice capture device 101. For instance, to activate a pairing mode the user may tap the accelerometer 110 five times. An LED included within the UI indicators 115 will then begin blinking for a duration of 15 seconds (or another other suitable time duration) and the processor 102 places the PAN interface 112 into the pairing mode. Alternatively, a beeper within the UI indicators 115 will repetitively beep for a duration of 15 seconds while the processor 102 places the PAN interface 112 into the pairing mode. When pairing is successful, the LED may flash a success pattern and then stop blinking and/or the beeper will beep a success tone; alternatively, if failure or no pairing, the LEDs may simply stop blinking and/or the beeper stop beeping without the success message to the user. If so desired, the voice capture device 101 may also include a liquid crystal display (LCD) and/or other UI components for better interaction with the user.

Once a device such as smartphone 120 is paired with the voice capture device 101, at step 314 the voice capture device 101 will check to see whether a Bluetooth connection is available with that device. In this way, if the user has paired multiple devices with the voice capture device 101, as long as the voice capture device 101 is within range of at least one of these devices, the process of FIG. 3 will continue from step 314 to step 316 to upload the audio files to that destination device (i.e., the first of the paired devices that is found to be connectable). That destination device will then perform the various steps of FIG. 4 indicated as performed by the "mobile phone 120". Again, any intermediate computing device can perform these steps, not only the user's smartphone 120.

Similar use of the accelerometer 110 as a UI input means and the LEDs/beeper/speaker/vibration motor of the UI indicators 115 as a UI output means can be used to allow the user to check the battery level of the voice capture device 101, turn on and off the voice capture device 101, and clear all paired devices (or a specific paired device) from memory of the voice capture device 101, for example. For example, different numbers of taps on the accelerometer 110 and different numbers of flashes (and/or colors) by the LED or beeps by the beeper can be employed for the user to access different functions and to display different output messages.

Figure 5:
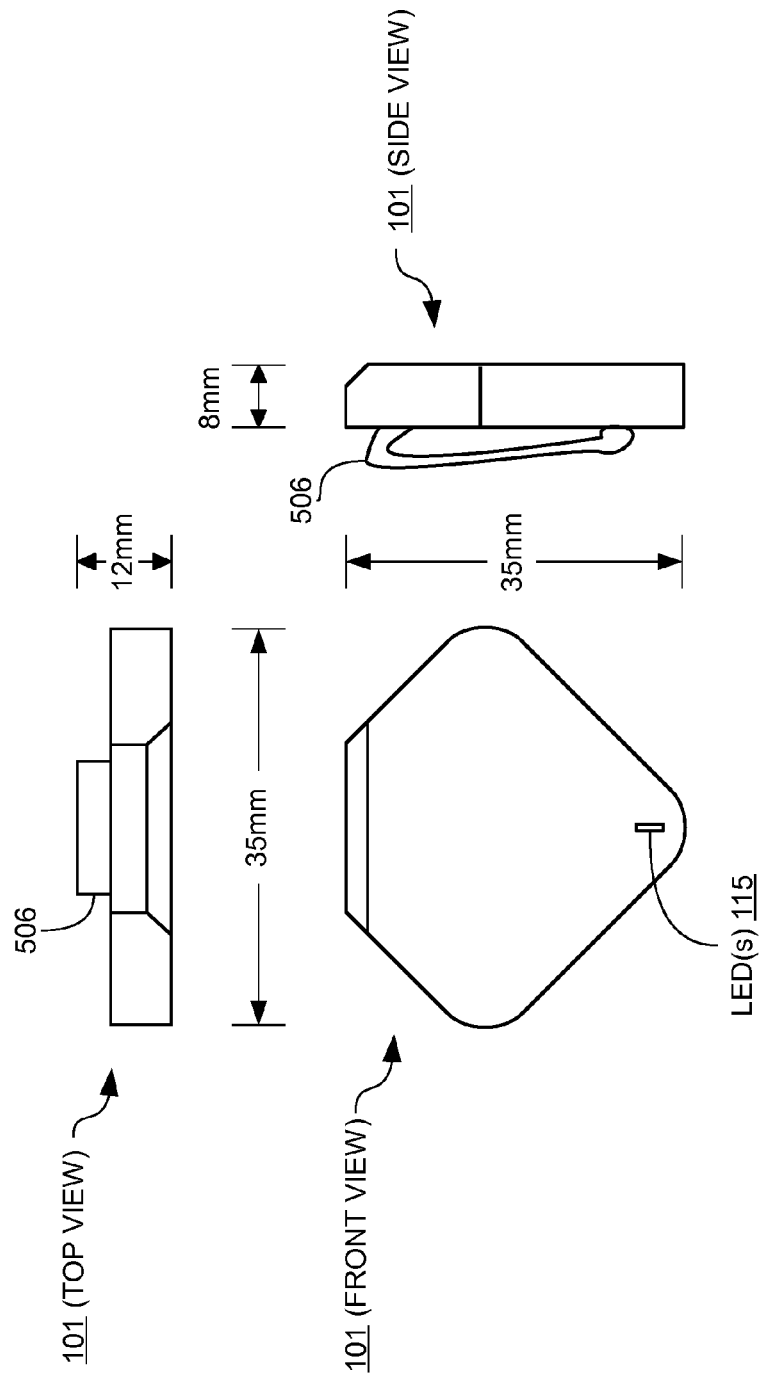
FIG. 5 illustrates a multiview drawing of the voice capture device of FIG. 1 including top, front, and side views according to an exemplary embodiment of the invention.

FIG. 5 illustrates a multiview drawing of the voice capture device 101 of FIG. 1 including top, front, and side views. In this embodiment, the voice capture device 101 is approximately 3.5 cm in both length and width with a maximum thickness of 1.2 cm, and has a clip 506 that enables the device 101 to be attached to the user's clothing.

In some embodiments the voice capture device 101 is the same shape as illustrated but may be larger or smaller. In some beneficial embodiments, the voice capture device 101 is less than five centimeters in each of its length, width, and height dimensions and has a mass of less than twenty grams. In this way, the voice capture device 101 is easily worn on the user's person and can be carried with the user in an easily accessible fashion at all times throughout the day. In other embodiments, the voice capture device 101 is integrated with another device such as the user's glasses or identity badge. The voice capture device 101 may be fully or partially integrated on a single chip with dimensions of 3 mm by 3 mm or smaller. This is beneficial for example to include the voice capture device 101 within existing products such as within a Bluetooth headset or earpiece. In yet other embodiments the voice capture device 101 may be larger in size with a mass of less than fifty grams. Any other sizes and masses may be utilized in other embodiments.

Different shapes for the voice capture device 101 and different attachment mechanisms may also be employed in other embodiments. For example, a pin could be utilized to hold the device 101 on user's clothing instead of a clip 506. Another voice capture device 101 may be circular in shape and include a strap so that it can be worn similar to a wrist watch or a wrist band, or necklace, or ring. In fact, the various components of the voice capture device 101 shown in FIG. 1 may be integrated with a wrist watch or any other piece of jewelry or article of clothing usually worn by a user. In another embodiment, a voice capture device 101 is integrated into a pair of glasses. In yet another embodiment it may be integrated into a hearing aid worn in the user's ear. Other examples include integrating the voice capture device within a key chain attached to the user or any other item carried by the user. Different voice capture device 101 may be designed for each of a plurality of different body zones such as upper chest, head, shoulders, arms, hands, etc. Users may thereby choose a particular voice capture device 101 suitable for the user to carry in a desired body zone.

Figure 6:
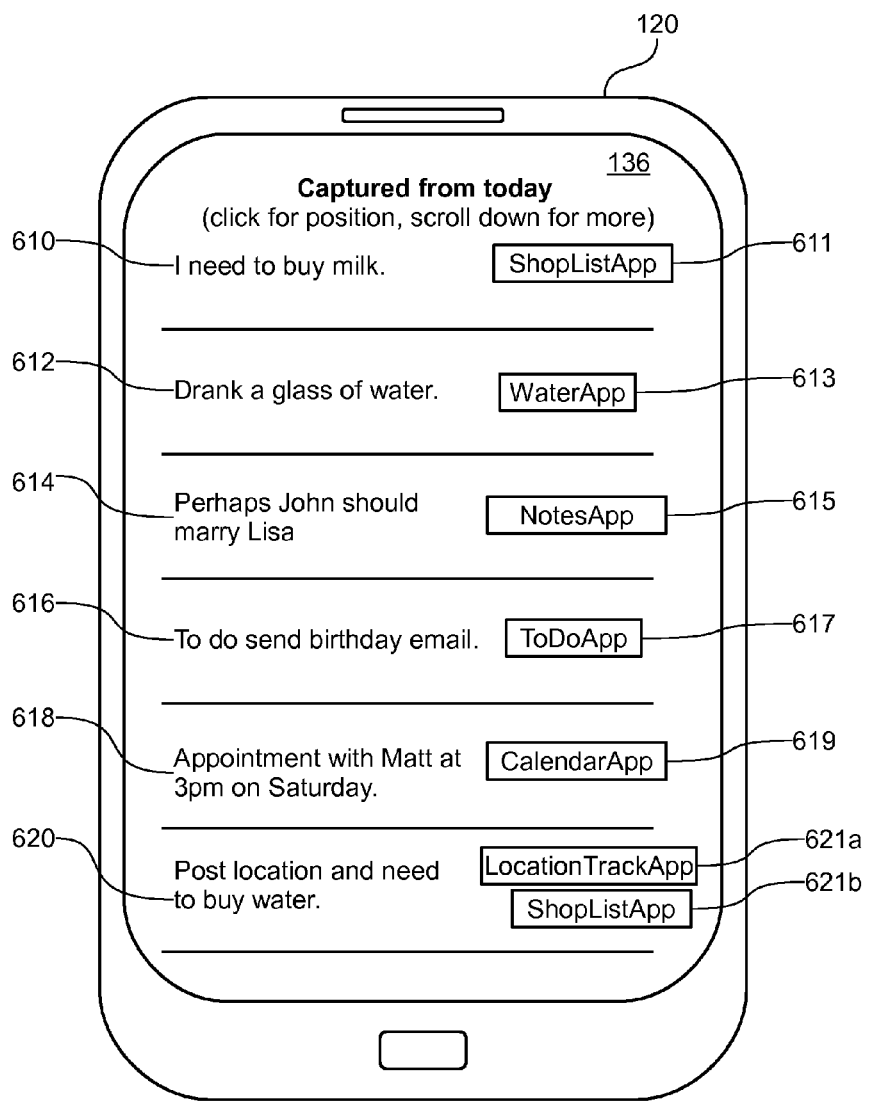
FIG. 6 shows an example user interface (UI) screen allowing the user to review the user's history of text records according to an exemplary embodiment of the invention.

FIG. 6 shows a UI screen allowing the user to review their history of text records and correct how each record has been associated with an application. In this embodiment, the user's history of text records is stored in the user's cloud account on the user records server 154 and the history is also synchronized with the voice-note app running on the user's smartphone 120. In this way, the user may utilize the voice-note app running on the smartphone 120 to view the history of text records for the user on touchscreen 136. Either a partial history of text records or a full history of text records for the user may be sent by the user records server 154 to the user's smartphone 120. This transfer may occur automatically such as during a synchronization cycle or may occur in response to a request from the user's smartphone 120, which may occur for example when the user clicks within the voice-note app to open the UI screen shown in FIG. 6. Alternatively, the user may log into the user's cloud account via any Internet-connected computing device such as the user's home computer 152 (e.g., desktop, laptop, tablet, netbook, etc.) in order to review their history of text records.

As shown in FIG. 6, the user in this example has made a number of voice recordings via the voice capture device that have been automatically converted by the processes of FIG. 3 and FIG. 4 into text records and stored within the user's database account on the user records server 154. For instance, a first text record 610 was captured as "I need to buy milk" and was pushed to the user's shopping list according to rule #3 in Table 1 matching the keyword "buy". Also displayed is the "ShopListApp" button 611 indicating to the user that this text record 610 was added to the user's shopping list. If the user feels that this text record 610 was incorrectly categorized the user can tap the text and then tap the appropriate app icon(s) in a grid of different available app icons that will appear. For each of the user's newly selected app(s), the user records server 154 will send the text record (or a portion thereof) to that selected app and will create a new rule (e.g., in Table 1) causing similar text records to be associated with that app in the future. Alternatively, the user can click the ShopListApp button 611 in order to modify the corresponding rule #3.

In another example, a second text record 612 was captured as "Drank a glass of water" and was pushed to the user's water drink goal monitoring app according to rule #2 in Table 1 matching the keyword "water". The "WaterApp" button 613 indicates to the user that this text record 612 was pushed to the user's water drink goal monitoring app. If the user feels that this text record 612 was incorrectly categorized the user can tap the text and then tap the appropriate app icon(s) in the grid of different available app icons that will appear in order to associate the text record with the newly selected app(s). Alternatively, the user can click the WaterApp button 613 in order to modify the corresponding rule #2.

A third text record 614 was captured as "Perhaps John should marry Lisa" and was pushed to the user's general note taking application according to default rule #N in Table 1 matching the wildcard keyword "*" and none of the previous rules applying. Such a default rule to place all uncategorized text records on a single list such as within the general note taking app may be useful for some users such as authors who could have inspirational ideas about the characters in their story and wish to compile all these ideas lacking a specific keyword/keyphrase together. The "NotesApp" button 615 indicates to the user that this text record 614 was pushed to the user's general note taking app. If the user feels that this text record 614 was incorrectly categorized the user can tap the text and then tap the appropriate app icon(s) in the grid of different available app icons that will appear in order to associate the text record with the newly selected app(s). Alternatively, the user can click the NotesApp button 615 in order to modify the corresponding default rule #N.

A fourth text record 616 was captured as "To do send birthday email" and was pushed to the user's to do list according to rule #1 in Table 1 matching the keyphrase "to do". The "ToDoApp" button 617 indicates to the user that this text record 616 was pushed to the user's to do list. If the user feels that this text record 616 was incorrectly categorized the user can tap the text and then tap the appropriate app icon(s) in the grid of different available app icons that will appear in order to associate the text record with the newly selected app(s). Alternatively, the user can click the ToDoApp button 617 in order to modify the corresponding rule #1.

A fifth text record 618 was captured as "Appointment with Matt at 3 pm on Saturday" and was pushed to the calendar app as a new appointment at 3 pm on Saturday according to rule #4 in Table 1 matching the keyword "appointment". The "CalendarApp" button 619 indicates to the user that this text record 618 was pushed to the user's external calendar application (e.g., Google calendar). If the user feels that this text record 618 was incorrectly categorized the user can tap the text and then tap the appropriate app icon(s) in the grid of different available app icons that will appear in order to associate the text record with the newly selected app(s). Alternatively, the user can click the CalendarApp button 619 in order to modify the corresponding rule #4.

A sixth text record 620 was captured as "Post location and need to buy water" and was pushed to both the user's location tracking app and the user's shopping list according to rule #5 in Table 1 matching the keyphrase "post location" in the first portion of the text record and according to rule #3 in Table 1 matching the keyword "buy" in the second portion of the text record. Although the second portion of text record 620 also includes the keyword "water" from rule #2, rule #2 does not match as a result of the negative keyword "buy" in rule #2. As a result, text record 620 results in updates being sent by the user records server 154 to both the user's location tracking app and shopping list. The "LocationTrackApp" button 621*a* and the "ShopListApp" button 621*b* indicate to the user that this text record 620 was pushed to both the user's location tracking app and shopping list. If the user feels that this text record 620 was incorrectly categorized the user can tap the text and then tap the appropriate app icon(s) in the grid of different available app icons that will appear in order to associate the text record with the newly selected app(s). Alternatively, the user can click either of the "LocationTrackApp" button 621*a* and the "ShopListApp" button 621*b* in order to modify the corresponding rule #5 or rule #3, respectively.

Figure 7:
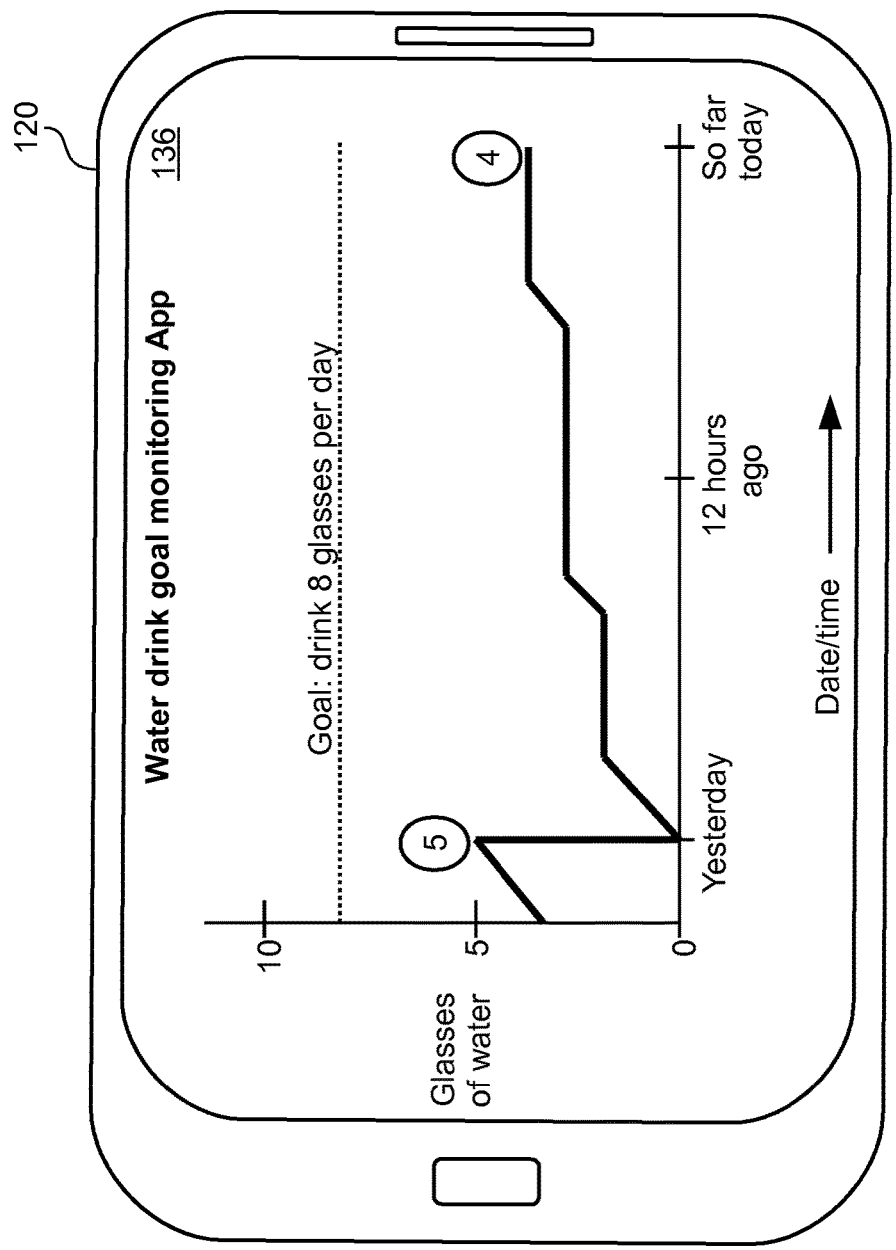
FIG. 7 shows an example UI screen presenting a graph of water usage as tracked by a user's water drink goal monitoring app and displayed on the touchscreen of the smartphone of FIG. 1 according to an exemplary embodiment of the invention.

FIG. 7 shows a UI screen presenting a graph of water usage as tracked by user's water drink goal monitoring app and displayed in the touchscreen 136 of smartphone 120. The water drink goal monitoring app helps a user who is trying to drink a certain amount of water on a daily basis to monitor and meet that goal.

As the user goes about their day they wear the voice capture device 101. Each time the user drinks a glass of water the user taps the voice capture device 101 and says "drank a glass of a water". The voice capture device 101 captures an audio file of the user's voice saying "drank a glass of a water" and automatically uploads this audio file to the user's smartphone 120 following the procedure of FIG. 3. Similarly, the smartphone 120 thereafter automatically sends the audio file to the voice-to-text server 156 and the user records server 154 following the procedure of FIG. 4. The user records server 154 analyzes the text record of "drank a glass of water", detects the keyword "water" matching rule #4 in Table 1, and accesses the application programming interface for the user's water drink goal monitoring app in order to inform that app that the user has drank a glass of water. The time and date of the text record indicates the time and date that the glass of water was drank. Likewise, the GPS coordinates for the location of the voice capture device 101 (or the smartphone 120 as synchronized with the time of the audio recording) indicates the place that the user drank the glass of water. The water drink goal monitoring app can then be run by the user at any time in order to see how close they are to meeting their goal for the current day and to see whether they met their goal on previous days.

Although a water drink goal monitoring app is shown as an example in FIG. 7, of course the system 100 is not limited to only water drink monitoring and may be utilized to monitor and track any number of situations. For instance, a similar app in a different embodiment is for counting calories.

In an example of a calorie counting app, the system 100 looks up approximate calorie counts for food and portion sizes mentioned by the user and parsed from the text records in order to keep track of the user's calorie counts. The app works as follows: each time the user eats, the user taps the voice capture device 101 and says something like, "just ate a chocolate bar." The voice capture device 101 captures an audio file of the user's voice and automatically uploads the corresponding audio file to the user's smartphone 120 following the procedure of FIG. 3. Similarly, the smartphone 120 thereafter automatically sends the audio file to the voice-to-text server 156 and the user records server 154 following the procedure of FIG. 4.

The user records server 154 analyzes the text record of "just ate a chocolate bar", detects the keyword "ate" matching rule #6 in Table 1, and accesses the application programming interface for the user's calorie counting app in order to inform that app that the user has eaten a chocolate bar. The calorie counting app looks-up the average calorie count of a chocolate bar and adds that to the user's record of calories for the day. For example, the system may add 550 calories to the user's record since that is an average calorie count for a typical chocolate bar. The time and date of the text record indicates the time and date that the calories were eaten. Likewise, the GPS coordinates for the location of the voice capture device 101 (or the smartphone 120 as synchronized with the time of the audio recording) indicates the place that the user ate along with the food item. The calorie counting app can then be run by the user at any time during the day in order to see how close they are to meeting their calorie goal for the current day and to see whether they met their goal on previous days.

More specific information regarding the food the user has eaten that may be included within the text record is utilized by the system 100 to automatically determine a more accurate calorie count. For instance, the user may specify the exact brand and/or size of the chocolate bar, which is used by the system 100 to automatically determine the manufacturer's exact calorie value. User's may also create and populate their own table of food items and corresponding calorie values, which will automatically be utilized by the system to count the user's total calories as the user reports eating the foods on the table during the day according to the above-described process.

In a simpler version of a calorie counting app, each time the user eats, the user themselves estimates the number of calories, taps the voice capture device 101 and says something like, "just ate a chocolate bar, about 100 calories." The voice capture device 101 captures an audio file of the user's voice and automatically uploads the corresponding audio file to the user's smartphone 120 following the procedure of FIG. 3. Similarly, the smartphone 120 thereafter automatically sends the audio file to the voice-to-text server 156 and the user records server 154 following the procedure of FIG. 4.

The user records server 154 analyzes the text record of "just ate a chocolate bar, about 100 calories", detects the keyword "calories" matching rule #6 in Table 1, and accesses the application programming interface for the user's calorie counting app in order to inform that app that the user has eaten another 100 calories. The time and date of the text record indicates the time and date that the calories were eaten along with the food item. Likewise, the GPS coordinates for the location of the voice capture device 101 (or the smartphone 120 as synchronized with the time of the audio recording) indicates the place that the user ate. The calorie counting app can then be run by the user at any time during the day in order to see how close they are to meeting their calorie goal for the current day and to see whether they met their goal on previous days.

A similar counting app can be designed by the user to count any desired items. By accessing the SDK server 160 from either within the voice-note app or from a web interface access on the user's computing device 152, users themselves are enabled to create any number of these types of custom apps. A user can select a graphical app template for this type of app and add labels for the items they are tracking and select functions such as 'increment reported values' and set daily, weekly, monthly, or yearly goals. For example, a daily budget-monitoring app can be built by the user and then updated via voice notes using the above-described processes. In such an app, a rule can be added to Table 1 with a keyword "just spent" in order to match the dollar count just spent by the user in order to track purchases. The SDK server 160 hosts an API that computer programmers can access and utilize to create any custom app that runs using text records obtained via that API. In this way, users can update their own custom apps via voice-notes recorded on the voice capture device 101 at any time during the day. User designed applications can be hosted and run either internally within the cloud system (e.g., on SDK server 160) or on another user-administered server located elsewhere on the Internet 150.

To summarize some exemplary embodiments, an electronic device includes a digital microphone and flash memory to instantly capture a voice stream and save it as an audio file in the device memory. The audio files are further transformed automatically into a text file and contextually assigned or forwarded to appropriate smartphone 120 and/or computer applications. The device is activated by a single finger tap, which triggers an accelerometer which in turn activates the recording device. Alternate activation methods include: voice activation, push button.

The device works independently, at any place and any time recording and storing all speech that user chooses to record. The following audio formats are supported: WAV, SPEEX, OPUS and other formats can be utilized as well. Each recorded event is associated with its specific time and location. The location is saved in GPS coordinates. There are two ways to determine the GPS location: 1) through integrated GPS chip; 2) through a dedicated software application in user's smartphone 120. With the second option a dedicated procedure turns the smartphone 120 GPS 130 on with a repetitive time-set and saves the current location in the smartphone 120 memory 126. Later, these recorded events (once transferred to the smartphone 120 from the voice capture device 101) are each associated with the time points and their nearest saved GPS locations.

Whenever the voice capture device 101 is in the Bluetooth range from the user's smartphone 120 (alternative: has a wireless connection to the cloud via Wi-Fi, Wi-Fi Low Energy, 3G, 4G) each saved data set (i.e., each audio file and its associated time and location markers) is automatically transferred to the smartphone 120 via one of Handsfree, BLE, SSP protocols, or their combinations. Once the data migration to the user's smartphone 120 is completed, all audio files are converted into text files using a third-party or internal speech-to-text service 156.

Further, the raw data (audio, text, and service files) is synced with the user's Internet cloud account 154 and assigned to groups (like to-do list, shopping list, social nets, consumed calories, and many others) based upon dedicated keywords or keyphrases. The assigned/sorted data is synced back with the smartphone 120 and its applications.

These applications can be third-party (sourced for example via Apple Store, Google Play Store, Windows Store, Blackberry World, etc.), as well as created by users within the voice-note application environment. User developed applications may be developed within a software development toolkit (SDK) based "Constructor"—a tool which allows the users to build or customize applications for their personal needs as well as to share the finished applications with others. The text and/or audio files and keywords/keyphrases are considered as input parameters; analytical algorithms/procedures/functions are incorporated as application body; graphs, pics, numbers, and text blocks are presented as output parameters.

The voice capture device 101 in this embodiment consists of a digital microphone 106, flash memory 108, ARM processor 102, BT transmitter 112 and water/dust-resistant shell (as defined by IP67 Standard).

The system 100 of FIG. 1 allows users, with minimal to no distraction, at any place and at any time, to instantly memorize their thoughts, ideas or notes with a single finger tap or a voice activation command; have these saved thoughts and notes automatically processed, analyzed and assigned by smartphone 120 applications to appropriate contextual groups or folders. In some embodiments the process does not require the user to access or touch the smartphone 120. In addition, the system 100 solution allows users to easily build or customize their own applications to better utilize their saved notes, thoughts and ideas.

In some embodiments the system 100 depends on a single third-party system 156 for voice-to-text (VTT) conversion. However, in other embodiments the number of VTT providers may be increased to lower dependence and associated risks of using a single external voice-to-text serer 156, as well as to improve the speech recognition quality by comparing and merging the results of multiple VTT providers for a single audio file. The user records server 154 may also incorporate a voice-to-text server 156 to avoid any external requirements and further improve the recognition quality.

A benefit of the system of FIG. 1 is that the voice capture device 101 includes minimal functionality for recording the user's voice notes and then automatically transferring the record audio files to the user's smartphone 120. The capture device 101 is therefore small, light, and long lasting due to minimal power requirements. All the rest of the required functionality for processing the audio files and updating the user's cloud database is handled by other devices in the system 100 such as the user's smartphone 120 and the user records server 154.

However it is not a requirement that all voice capture devices according to the invention must utilize an intermediate device 120; indeed, one or more wireless communication interface(s) in addition to or instead of the PAN interface 112 may be incorporated into the voice capture device 101 with the purpose to get a direct connection to user's cloud account on the user records server 154 without requiring the use of a smartphone 120 or other intermediate device.

Figure 8:
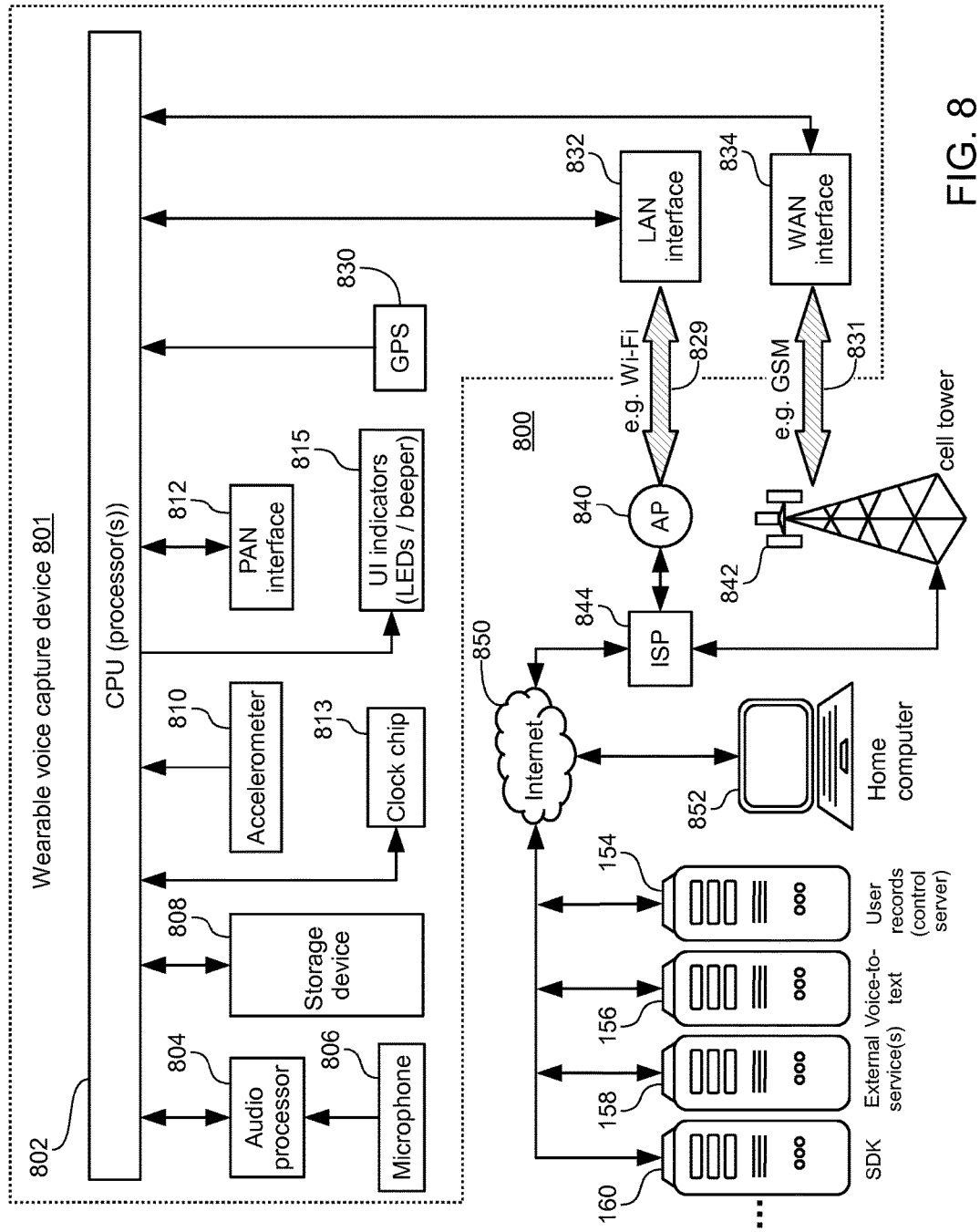
FIG. 8 shows a block diagram of a system for helping users capture and act upon fleeting thoughts according to an exemplary embodiment of the invention.

FIG. 8 shows a block diagram of a system 800 for helping users capture and act upon fleeting thoughts according to an exemplary embodiment of the invention. In this embodiment, the voice capture device 801 includes components similar to those included in the voice capture device 101 device such as one or more processors 802, an audio processor 804, microphone 806, storage device 808, accelerometer 810, clock chip 813, PAN interface 812 and UI indicator(s) 815. These components generally function as previously described with only minor differences described in the following.

Unlike the system 100 of FIG. 1, however, the voice capture device 801 in FIG. 8 does not rely on the user's smartphone 120. Instead, the voice capture device 801 in FIG. 8 further includes a global positing system (GPS) receiver chip 830, a LAN interface 832, and a WAN interface 834. The additional communication interfaces 832, 834 provide the processor 802 with the ability to communicate directly with the user records server 854 via the Internet 150, which acts as a control server in this embodiment.

The operation of the voice capture device 801 of FIG. 8 is very similar to that described earlier in FIG. 3. However, there are a few differences in this embodiment as follows.

Firstly, at steps 306, 308, 310, in addition to recording the audio file from the user's voice picked up by microphone 806 and the time and date of the recording as retrieved from the clock chip 813, the processor 802 further includes with the audio file the position of the voice capture device 801 as retrieved from the GPS chip 830 at the time of the recording. In this way, the audio file is tagged with both a time/date and GPS coordinates respectively corresponding to the time/date of the recording and the position on the Earth where the recording was made.

Another difference is that at step 314, rather than only seeking a PAN connection (e.g., a Bluetooth connection) with the user's smartphone 120, the processor 802 of FIG. 8 checks to see whether a connection to Internet 150 is available such as via one or both of LAN/WAN interfaces 832, 834.

In this embodiment, all three of PAN, LAN, and WAN interfaces 812, 832, 834 are included so any of these communication paths are available. However, although the voice capture device 801 of FIG. 8 includes three separate communications interfaces 812, 832, 834, in other embodiments, one or more of these three interfaces 830, 832, 834 may be omitted. Additionally, other types of communication interfaces in addition to or instead of Bluetooth, Wi-Fi, and GSM may be included such a near field communication (NFC), Ethernet, serial ports, CDMA, and any other forms of wired or wireless communication protocols. In this way, step 314 in this embodiment should be generalized to "Communication connection?" where the processor 802 checks each of the available communications interfaces 812, 832, 834 to find whether a connection is possible to any intermediate device running the voice-note application such as the user's smartphone 120 or laptop computer 852, or whether a connection is possible directly to the cloud-based user records server 854 via the Internet 850 (or another network).

When a communications connection is available, the processor 802 transfers the various pending audio file(s) from the voice capture device 802 to either the intermediate device or the control server 852 as applicable following the steps 316-322 of FIG. 3. As the process for transferring the files through an intermediate device such as the user's smartphone 120 has already been explained previously with respect to the system 100 of FIG. 1, in the following description, it is assumed that one of the LAN/WAN communications paths 829, 834 is available and the processor 802 transfers the files directly to the user records server 854 via the Internet 850.

Figure 9:
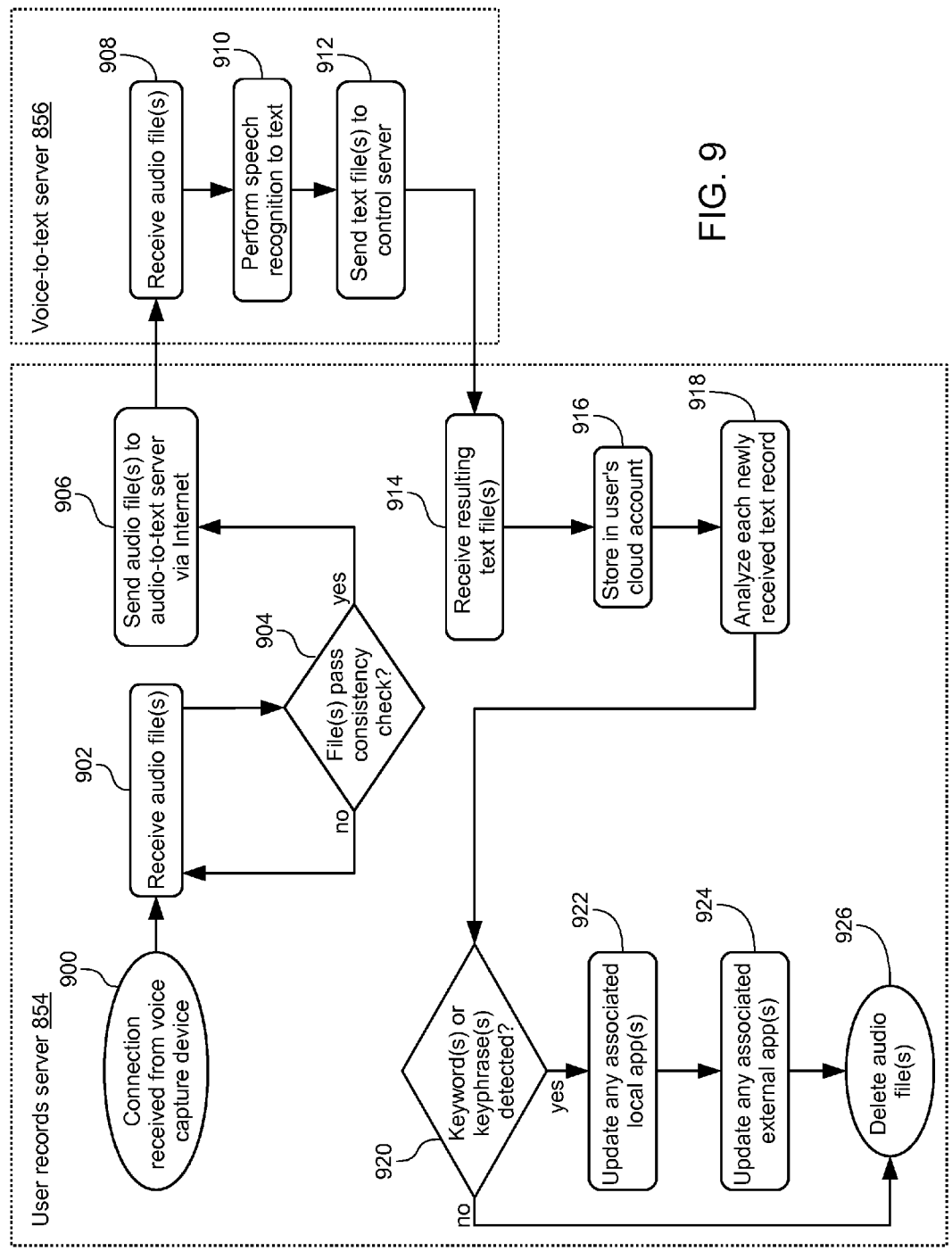
FIG. 9 shows a flowchart of operations performed by the user records server and voice-to-text server of FIG. 8 according to an exemplary embodiment of the invention.

FIG. 9 shows a flowchart of operations performed by the user records server 854 and voice-to-text server 856 of FIG. 8 according to an exemplary embodiment of the invention. The steps of FIG. 9 are not restricted to the exact order shown, and, in other embodiments, shown steps may be omitted or other intermediate steps added. In this embodiment, processors (not shown) in each of the user records server 854 and voice-to-text server 856 execute software instructions loaded from storage devices therein in order to cause these servers 854, 856 to perform the illustrated steps.

Many of the steps shown in FIG. 9 correspond to similar steps described earlier for FIG. 4; however, in the embodiment of FIG. 9 the user's smartphone 120 is not involved and the user records server 854 acts as a control server. In this way, the voice capture device 801 simply needs to successfully transfer the recorded audio file(s) to the cloud-based user records server 854 in order to start the process of FIG. 9. The voice capture device 801 does not need to concern itself with other servers on the Internet 850 such as the text-to-speech server 856.

Steps 900, 902, 904 of FIG. 9 respectively show that the user records server 854 receives the communications connection from the voice capture device 801 (e.g., an Internet TCP/IP connection carried over Wi-Fi or GSM connection 829, 831) and then receives and verifies the integrity of the recorded audio files over that connection. From this point on, the voice capture device 801 is not involved and may return to the sleep state (see step 322 of FIG. 3) until the user activates it to record a future audio file, for example.

The data connection at step 900 may be established by the voice capture device 801 immediately after the audio file(s) are recorded such as when the voice capture device 801 is currently located within range of either or both of AP 840 and/or cell tower 842. Alternatively, the connection 829, 831 to the Internet 850 may be automatically established by the processor 802 of the voice capture device 801 at any later time such as when the voice capture device 801 comes within range of either an AP 840 and/or cell tower 842. As before, this may occur when the user wearing or otherwise carrying the voice capture device 801 returns from a nature preserve lacking Internet service to an urban area that has cell towers 842 and/or APs 840 positioned every few city blocks.

At step 906 the user records server 854 sends the audio file(s) to the voice-to-text server 856 via the Internet 850 in order to access an externally provided speech-to-text conversion service. In some embodiments, the voice-to-text server 856 is a separate computer server and this step involves sending the audio file(s) over the Internet 850. In other embodiments, the voice-to-text server 856 is integrated within the user records server 854 and this step involves inter-process communication with the user records server 854 to access an internally available a speech-to-text conversion service.

At step 908, the voice-to-text server 856 receives the audio file(s) from the user records server 854 either via the Internet 850 or via internal communications. Although not shown in FIG. 9, this transfer of files may also involve a file integrity check employing checksums to ensure that the audio file(s) are correctly transferred.

At step 910, the voice-to-text server 856 performs speech recognition on the received audio file(s) and generates a corresponding text record for each audio file. This step corresponds to step 410 of FIG. 4; a repeated description therefore is omitted herein for brevity.

At step 912, the voice-to-text server 156 sends the text record(s) generated at step 910 to the user records server 854 via either the Internet 150 or internal communications. Although not shown in FIG. 9, this transfer of these text record files may also involve a file integrity check employing checksums to ensure that they are correctly transferred.

At step 914, the user records server 854 receives the text record(s) from the voice-to-text server via either the Internet 150 or internal communications.

At step 916, the user records server 854 stores each of the received text records into a central database storing the user's history of text records. This step corresponds to step 420 of FIG. 4; a repeated description is omitted herein for brevity.

At step 918, the user records server 854 analyzes each newly received text record in order to find certain predetermined keywords. This step corresponds to step 422 of FIG. 4; a repeated description is therefore omitted herein for brevity.

At step 920, when none of the newly received text records for the user contains any predetermined keyword or keyphrases, control proceeds to step 926. Otherwise, for each text record that does contain at least one predetermined keyword or keyphrase, control proceeds to step 922. This step corresponds to step 424 of FIG. 4; a repeated description is therefore omitted herein for brevity.

At steps 922 and 924, the user records server 854 updates any associated applications with the text records according to the matching keywords and keyphrases. At step 922 'local' application(s) are updated and at step 924 'external' applications are updated. These steps correspond to steps 426 and 428 of FIG. 4; a repeated description is therefore omitted herein for brevity.

At step 926, the user records server 854 optionally deletes the audio file(s) corresponding to the text record(s) that have now been successfully processed. As previously mentioned, whether and/or when the original audio files are automatically deleted by the user records server 854 is a user configurable setting.

A benefit of the system of FIG. 8 is that the voice capture device 101 does not require transferring the recorded audio files to the user's smartphone 120. Instead, the voice capture device 801 includes a communications interface capable of transferring the files directly to the cloud-based user records server 854 via the Internet 850. In this way, the user is not required to have a smartphone 120 or other computing device to act as an intermediary.

Although the invention has been described in connection with preferred embodiments, it should be understood that various modifications, additions and alterations may be made to the invention by one skilled in the art. For example, in another embodiment, step 406 of the flowchart of FIG. 4 is modified so that the smartphone 120 only passes the audio file(s) to the user records server 154. The user records server 154 then acts as a control server and handles all remaining processing by following the flowchart of FIG. 9 starting at step 900 when the connection is received from the user's smartphone 120.

In another example modification, the flowchart of FIG. 4 is modified so that, rather than the user's smartphone 120 sending the text file(s) to the user records server 154 at step 416, all the various steps 418-430 previously performed by the user profile server 154 are instead performed internally by the processors user's smartphone 122 of the user's smartphone. A benefit of this embodiment is that no cloud server or Internet connection is required. Instead the system only requires the voice capture device 101 and another device such as the user's smartphone 120. Privacy for the user's data is increased in this embodiment since the user has direct control of both their devices 101, 120 and their audio files and text records.

In another example modification, all functionality of either or both of the flowcharts FIG. 4 and FIG. 9 is performed by one or more processors 102, 802 included within the voice capture device 101, 801 itself. In this embodiment, the voice capture device 101, 801 further includes a UI interface such as a wireless video port that allows the user to display and interact with their history of text records using an external monitor or other display device (not shown). An advantage of this embodiment is that the voice capture device 101, 801 stays small, light, and wearable by not including a full sized user interface screen; instead, the user can take advantage of any external monitor or display that is compatible with the UI interface protocol supported by the voice capture device 101, 801.

In yet another example modification, the voice capture device 101, 801 sends the recorded audio file(s) to the user's smartphone 120 and the smartphone 120 performs the voice-to-text conversion rather than utilizing an external voice-to-text server 156, 856. The resulting text record(s) are thereafter stored at either or both of the cloud based user records server 854 and/or the user's smartphone 120 or other computing device(s) 152, 852.

In yet another example modification, the voice capture device 101, 801 may upload an audio file as that audio file is being recorded. For example, if there is a current communications connection available at step 314 of FIG. 3 and the user taps the voice capture device 101, 802 to begin recording a new voice note, the processor 102, 802 may immediately start uploading the audio file before it has finished being recorded. An advantage of this embodiment is the storage requirements of the on-board storage device 108, 808 of the voice capture device 101, 801 are reduced. In some applications it may be known in advance that there will always be a connection available at step 316. For example, in a corporate environment where employees all wear and utilize voice capture devices 101, 801 but only while in a particular facility where access points 140 are guaranteed to be located, the storage device 108 of the voice capture device 101, 801 may be reduced in size since it will never need to store complete audio files. Instead, the audio files can always be uploaded as they are being recorded. Once a portion is successfully uploaded it can be deleted at voice capture device 101 even while subsequent portions of the audio file are still being uploaded.

In yet another example modification, rather than the network 150, 850 being the Internet, these networks 150, 850 comprise intranets, private networks, or any other compute network. For example, a company may utilize the company's own intranet for security purposes.

It should also be noted that although the above examples have focused on the intermediary device being the user's smartphone 120, any computing device rather than the user's smartphone 120 can act as the intermediary. For example, the user may run the voice-note application on their home computer 152, which includes a compatible communications interface to receive the audio files from the voice capture device 101 sent at step 316 of FIG. 3. Likewise, no intermediate device is required in some embodiments and step 316 of FIG. 3 involves the voice capture device 101, 801 sending the audio files directly to a cloud-based server such as user records server 154, 854 and/or voice-to-text server 156, 856. In this way, step 314 and 315 may be generalized to check for the availability of a data connection via any supported communications interface of the voice capture device 101, 801.

In this description, the term 'automatically' means without specific user action. For example, in preferred embodiments, the voice capture device 101, 801 automatically uploads the pending audio files after they are recorded at steps 314, 316 of FIG. 3 without requiring further action by the user to trigger the upload. In this way, even if the voice capture device 101, 801 is not able to immediately upload a pending audio file at the time it is recorded, the voice capture device 101, 801 will still automatically upload the audio file at a later time such as when the processor 102, 802 of the capture device 101, 801 detects that a data connection to an acceptable destination becomes available (i.e., at step 314). Likewise, upon receiving a new text record for a particular user, the user records server 854 automatically parses and updates the user's appropriate note groups, lists, and applications such as by detecting the keywords/keyphrases shown above in Table 1. In this way, the user does not need to remember to review any of the voice notes that match any of the keywords/keyphrases as these will all be processed automatically for the user by the cloud-based user records server 854.

The various separate embodiments, configurations, elements, features, modules, functionality of the invention described above may be integrated or combined. The above flowchart algorithms may be executed by one or more processors operating pursuant to instructions stored on a tangible, non-transitory computer-readable medium such as the above-described storage devices to perform the above-described functions of any or all aspects of the voice capture device 101, 801, smartphone 120, user records server 154, 854, and all other devices shown in FIG. 1 and FIG. 8. Examples of the computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer and/or processor(s) executing the instructions, or may be remote such as when coupled via a computer network such as the Internet 150, 850.

In another example, rather than being software modules executed by one or more processors, the above described flowcharts and other functionality may be implemented as hardware modules such as application specific integrated circuits (ASICs) or other types of programmable hardware such as gate arrays configured to perform the above-described functions. Functions of single devices shown above may be separated into multiple units, or the functions of multiple devices may be combined into a single unit such as a System on a Chip (SoC). Unless otherwise specified, features described may be implemented in hardware or software according to different design requirements. In addition to a dedicated physical computing device, the word "server" may also mean a service daemon on a single computer, virtual computer, or shared physical computer or computers, for example. Additionally, all combinations and permutations of the above described features and configurations may be utilized in conjunction with the invention.

What is claimed is:

1. A system for helping capture and act upon fleeting thoughts, the system comprising:
   a battery-powered voice capture device operated by a user and comprising one or more first processors, a microphone, a first storage device, and a communications interface;
   an intermediate computing device associated with the user and comprising one or more second processors, a first communications interface compatible with the communications interface of the voice capture device, a second communications interface compatible with an access device of a network, and a second storage device storing a predetermined application; and
   one or more computer servers coupled to the network;
   wherein the first storage device of the voice capture device stores software instructions that are executed by the one or more first processors of the voice capture device in response to the user activating an activation trigger on the voice capture device;
   the software instructions cause the one or more first processors of the voice capture device to store in the first storage device of the voice capture device an audio file corresponding to a finite amount of audio captured by the microphone after the user activates the activation trigger;
   the software instructions further cause the one or more first processors of the voice capture device to automatically transfer the audio file via the communications interface to the intermediate computing device, the transfer automatically occurring while the communications interface of the voice capture device is coupled to the first communication interface of the intermediate computing device;
   the predetermined application running on the intermediate computing device thereafter causes the one or more second processors of the intermediate computing device to automatically send the audio file to the one or more servers via the second communication interface coupled to the network;
   the one or more servers are operable to receive from the intermediate computing device via the network the audio file and automatically convert the audio file to a corresponding text record utilizing a speech-to-text conversion service;
   the one or more servers are further operable to automatically add the text record to a history of text records for the user stored in a database; and
   the one or more servers are further operable to send a copy of the history of text records for the user to the intermediate computing device;
   whereby the user may utilize the intermediate computing device to review the history of text records for the user as stored in the database and be reminded of actions that need to be taken in view thereof.

2. The system of claim 1, wherein:
   the voice capture device further comprises a first clock chip; and
   the software instructions further cause the one or more first processors of the voice capture device to include with the audio file a time stamp corresponding to a time and date that the audio file was recorded as tracked by the first clock chip.

3. The system of claim 2, wherein:
the predetermined app further causes the intermediate computing device to periodically store in a log: time and date as tracked by a second clock chip installed in the intermediate computing device along with a position of the intermediate computing device as tracked by a global positioning chip installed in the intermediate computing device; and
after receiving the audio file from the voice capture device, the predetermined app further causes the intermediate computing device determine an estimated position of the intermediate computing device at the time and date that the audio file was recorded according to the time stamp of the audio file as received from the voice capture device and times, dates and positions of the intermediate computing device stored in the log;
the predetermined application thereafter causing the intermediate computing device to automatically send the audio file along with the estimated position of the intermediate computing device at the time and date that the audio file was recorded to the one or more servers via the network.

4. The system of claim 1, wherein the one or more servers are further operable to:
automatically search the text record to determine whether it includes a particular keyword; and
when yes, send at least a portion of the text record to an application associated with the particular keyword.

5. The system of claim 4, wherein the one or more servers are operable to send at least the portion of the text record to the application associated with the particular keyword by accessing over the network an application programming interface of an externally hosted application.

6. The system of claim 4, wherein the one or more servers are operable to allow the user to modify a plurality of keywords to search for when parsing the text record and a plurality of associated applications to which at least a portion of the text record will be sent by the one or more servers when finding a match.

7. The system of claim 1, wherein the intermediate computing device is a mobile phone utilized by the user.

8. The system of claim 1, wherein the voice capture device comprises an accelerometer, and the activation trigger is activated upon the accelerometer detecting a motion by the user.

9. The system of claim 1, wherein the voice capture device comprises a button, and the activation trigger is activated upon the button being pressed by the user.

10. The system of claim 1, wherein the software instructions cause the one or more first processors of the voice capture device to automatically transfer the audio file to the intermediate computing device at a later time when the communications interface of the voice capture device is coupled to the first communication interface of the intermediate computing device after the audio file has been recorded.

11. A system for helping capture and act upon fleeting thoughts, the system comprising:
a battery-powered voice capture device comprising one or more processors, a microphone, a storage device, and a communications interface; and
one or more computer servers coupled to a network;
wherein the storage device of the voice capture device stores software instructions that are executed by the one or more processors in response to a user of the voice capture device activating an activation trigger;
the software instructions cause the one or more processors to store in the storage device an audio file corresponding to a finite amount of audio captured by the microphone after the user activates the activation trigger;
the software instructions further cause the one or more processors to automatically transfer the audio file via the communications interface to the one or more servers, the transfer automatically occurring while the communications interface of the voice capture device is coupled to an access node providing access to the network;
the one or more servers are operable to receive the audio file and automatically convert the audio file to a corresponding text record utilizing a speech-to-text conversion service;
the one or more servers are further operable to automatically add the text record to a history of text records for the user stored in a database; and
the one or more servers are further operable to send a copy of the history of text records for the user to a computing device associated with the user, the computing device being a different device than both the voice capture device and the one more servers;
whereby the user may utilize the computing device to review the history of text records for the user as stored in the database and be reminded of actions that need to be taken in view thereof.

12. The system of claim 11, wherein:
the voice capture device further comprises a clock chip; and
the software instructions further cause the one or more processors to include with the audio file a time stamp corresponding to a time and date that the audio file was recorded as tracked by the clock chip.

13. The system of claim 11, wherein:
the voice capture device further comprises a global positioning chip; and
the software instructions further cause the one or more processors to power up the global positioning chip in response to the user of the voice capture device activating the activation trigger and to include with the audio file position coordinates corresponding to a current position as tracked by the global positioning chip when recording the audio file.

14. The system of claim 11, wherein the one or more servers are further operable to:
automatically search the text record to determine whether it includes a particular keyword; and
when yes, automatically send at least a portion of the text record to an application associated with the particular keyword.

15. The system of claim 14, further comprising a software development toolkit (SDK) server enabling the user to create the application.

16. A voice capture device for helping capture and act upon fleeting thoughts, the voice capture device comprising:
one or more processors powered by a battery;
a microphone,
a storage device, and
a communications interface;
wherein the storage device stores software instructions that are executed by the one or more processors in response to a user of the voice capture device activating an activation trigger;

the software instructions cause the one or more processors to store in the storage device an audio file corresponding to a finite amount of audio captured by the microphone after the user activates the activation trigger;

the software instructions further cause the one or more processors to automatically transfer the audio file via the communications interface to one or more servers either directly via a network or via an intermediate computing device, the transfer automatically occurring at a later time after the audio file has been recorded when the communications interface of the voice capture device is coupled to either an access node providing access to the network or the intermediate computing device;

the one or more servers are operable to receive the audio file, automatically convert the audio file to a corresponding text record utilizing a speech-to-text conversion service, automatically add the text record to a history of text records for the user stored in a database, and send a copy of the history of text records for the user to a computing device associated with the user, the computing device being a different device than both the voice capture device and the one more servers;

whereby the user may utilize the computing device to review the history of text records for the user as stored in the database and be reminded of actions that need to be taken in view thereof.

17. The voice capture device of claim 16, further comprising an attachment means for physically securing the voice capture device to the user during normal usage.

18. The voice capture device of claim 16, further comprising:

a clock chip;

wherein the software instructions further cause the one or more processors to include with the audio file a time stamp corresponding to a time and date that the audio file was recorded as tracked by the clock chip.

19. The voice capture device of claim 16, further comprising:

a global positioning chip;

wherein the software instructions further cause the one or more processors to power up the global positioning chip in response to the user of the voice capture device activating the activation trigger and to include with the audio file position coordinates corresponding to a current position as tracked by the global positioning chip when recording the audio file.

20. The voice capture device of claim 16, further comprising an accelerometer, wherein the activation trigger is activated upon the accelerometer detecting a motion by the user.

* * * * *